United States Patent
Wedler et al.

(10) Patent No.: US 11,873,468 B2
(45) Date of Patent: Jan. 16, 2024

(54) POLYMERS FOR THE TREATMENT OF SURFACES

(71) Applicant: Henkel AG & Co. KGaA, Duesseldorf (DE)

(72) Inventors: Nils Wedler, Roedermark (DE); Christian Kropf, Hilden (DE); Laura Hartmann, Duesseldorf (DE); Stefan Schmidt, Duesseldorf (DE); Lukas Fischer, Duesseldorf (DE); Alexander Strzelczyk, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 571 days.

(21) Appl. No.: 16/905,523

(22) Filed: Jun. 18, 2020

(65) Prior Publication Data

US 2020/0399564 A1      Dec. 24, 2020

(30) Foreign Application Priority Data

Jun. 18, 2019   (DE) .......................... 102019208832.5

(51) Int. Cl.
  *C11D 3/00*     (2006.01)
  *C11D 3/37*     (2006.01)
  *C08G 69/48*    (2006.01)

(52) U.S. Cl.
  CPC ............ *C11D 3/0036* (2013.01); *C08G 69/48* (2013.01); *C11D 3/3719* (2013.01)

(58) Field of Classification Search
  CPC ........... C11D 3/00; C11D 3/37; C11D 3/3723; C11D 3/3769; C08G 69/48
  See application file for complete search history.

(56) References Cited

U.S. PATENT DOCUMENTS 6,605,270 B1   8/2003   Mandeville, III et al.
9,457,944 B2   10/2016  Meier et al.
(Continued)

FOREIGN PATENT DOCUMENTS

DE   102016223586 A1   5/2018
EP         3263623  *  1/2018   ............. C08G 65/00
(Continued)

OTHER PUBLICATIONS

Saad Mjoulay, Dopa/Catchol-Tethered Polymers: Bioadhesives and Biomimetic Adhesive Materials Polymer Reviews, vol. 54, issue 3, May 5, 2014, pp. 436-513.
(Continued)

*Primary Examiner* — Brian P Mruk
(74) *Attorney, Agent, or Firm* — James J. Cummings

(57) ABSTRACT

Catechol-group-containing polymers with amine or amide functionality, containing at least one repeating unit of the formula (I) and at least one repeating unit of the formula (II) and optionally further repeating units (Continued)

-continued

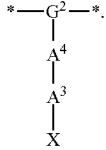

The repeating units of the formula (II) are different from the repeating units of the formula (I) and the molar ratio of the units of the formula (I) to the units of the formula (II) is in the range from 0.5-to-1 to 4-to-1, are suitable for the dirt-repellent finishing of substrate surfaces, particularly surfaces of textiles, glass, ceramics or plastics. The polymers have an excellent adhesion to these surfaces, so that during cleaning of a substrate surface they adsorb to the substrate surface from the aqueous cleaning or washing liquor and realize their effect.

13 Claims, 2 Drawing Sheets

(56) References Cited

U.S. PATENT DOCUMENTS

| 2006/0241281 | A1* | 10/2006 | Messersmith | C07K 17/14 |
| | | | | 530/324 |
| 2014/0041802 | A1* | 2/2014 | Klein | C08G 69/10 |
| | | | | 156/331.8 |
| 2016/0213707 | A1* | 7/2016 | Hedrick | C12N 7/00 |
| 2017/0274115 | A1* | 9/2017 | Yang | C08G 63/668 |
| 2017/0291971 | A1* | 10/2017 | Serrano | C09D 133/14 |
| 2019/0168938 | A1 | 6/2019 | Meier et al. | |

FOREIGN PATENT DOCUMENTS

| EP | 3263623 A1 | 1/2018 |
| WO | 2005070866 A2 | 8/2005 |

OTHER PUBLICATIONS

Extended European Search Report Application No. 20177979 Completed: Oct. 29, 2020 dated Oct. 30, 2020 10 Pages.
Ogura, Katsuyuki et al. "A Versatile Reagent for Aldehyde Synthesis. Methyl Methylthiomethyl Sulfoxide". Tetrahedron Letters, No. 34, 1971, pp. 3151-3154, Pergamon Press, Great Britain.
Kiso, Yoshiaki et al., "Deprotection of O-Methyltyrosine by a 'Push-Pull' Mechanism Using the Thioanisole-Trifluoromethanesulphonic Acid System. Application to the Convenient Synthesis of a Potent N-Methylenkephalin Derivative". Journal of the Chemical Society, Chemical Communications, 21, 1979, pp. 971-972.
Atherton E. et al. "Stability of Fluorenylmethoxycarbonylamino Groups in Peptide Synthesis.Cleavage by Hydrogenolysis and by Dipolar Aprotic Solvents". Tetrahedron Letters, No. 32, 1979, pp. 3041-3042, Great Britain.
Hartmann, Laura et al. "Toward the Development of an Artificial Cornea: Improved Stability of Interpenetrating Polymer Networks". Journal of Biomedical Materials Research B: Applied Biomaterials, vol. 98B, No. 1, Jul. 2011, pp. 8-17. DOI: 10.1002/jbm.b.31806.
Lin, Na et al. "Design and Synthesis of Boronic-Acid-Labeled Thymidine Triphosphate for Incorporation into DNA". Nucleic Acids Research, vol. 35, No. 4, Jan. 2, 2007, pp. 1222-1229. DOI: 10.1093/nar/gkl1091.
Palladino, Pasquale et al. "New TFA-Free Cleavage and Final Deprotection in Fmoc Solid-Phase Peptide Synthesis: Dilute HCl in Fluoro Alcohol." Organic Letters vol. 14, No. 24, 2012, pp. 6346-6349, American Chemical Society. DOI: 10.1021/0130124r.
Ponader, Daniela, et al. "Sequence-Defined Glycopolymer Segments Presenting Mannose: Synthesis and Lectin Binding Affinity." Biomacromolecules, vol. 13, No. 6, 2012, pp. 1845-1852. DOI: 10.1021/bm300331z.
Ponader, Daniela, et al. "Supporting Information for: Sequence-Defined Glycopolymer Segments Presenting Mannose: Synthesis and Lectin Binding Affinity". 70 pages.
Ye, Gang et al. "Controlled Architecture of Dual-Functional Block Copolymer Brushes on Thin-Film Composite Membranes for Integrated 'Defending' and 'Attacking' Strategies Against Biofouling". American Chemical Society Applied Materials & Interfaces, vol. 7, 2015, pp. 23069-23079. DOI: 10.1021/acsami.5b06647.
Lu, Dedai et al. The Synthesis and Tissue Adhesiveness of Temperature-Sensitive Hyperbranched Poly(amino acid)s with Functional Side Groups. Polymer Chemistry, vol. 7, 2016, pp. 1963-1970. DOI: 10.1039/c5py01844g.
Ebbesen, M. F. et al. "Biodegradable Poly(amidoamine)s with Uniform Degradation Fragments via Sequence-Controlled Macromonomers". Polymer Chemistry vol. 7, No. 46, 2016, pp. 7086-7093. DOI: 10.1039/c6py01700b.
Gerke, Christoph, et al. "Sequence-controlled glycopolymers via step-growth polymerization of precision glycomacromolecules for lectin receptor clustering." Biomacromolecules 18.3 (2017), Seiten 787-796.
Hebbar, R.S. et al. "Membrane Characterization; Chapter 12—Contact Angle Measurements". Science Direct Elsevier, 2017, pp. 219-255. ISBN 978-0-444-63776-5.
Sukhmanjot Kaur, Amal Narayanan, Siddhesh Dalvi, Qianhui Liu, Abraham Joy, and Ali Dhinojwala: Direct Observation of the Interplay of Catechol Binding and Polymer Hydrophobicity in a Mussel-Inspired Elastomeric Adhesive. In: ACS Gent. Sei., 4, 2018, 10, 1420-1429.
Donglin Gan, Tong Xu, Wensi Xing, Fig. 1 Xiang Ge, Umning Fang, Kefeng Wang, Fuzeng Ren, and Xiong Lu: Mussel-Inspired Contact-Active Antibacterial Hydrogel with High Cell Affinity, Toughness, and Recoverability. In: Adv. Funct. Mater., 29, 2019, 1805964.
Do Kyoung Yeon, Sangwon Ko, Seokyung Jeong, Seok-Pyo Hong, Sung Min Kang, and Woo Kyung Cho: Oxidation-Mediated, Zwitterionic Polydopamine Coatings for Marine Antifouling Applications. In: Langmuir, 35, 2019, 1227-1234.
German Search Report DE 10 2019 208 832.5 dated Sep. 27, 2019 pp. 1-9 (No Translation Available).

* cited by examiner

FIGURE 3A  FIGURE 3B

POLYMERS FOR THE TREATMENT OF SURFACES

FIELD OF THE INVENTION

The invention relates to polymers which in their molecular structure comprise at least one repeating unit with catechol functionalization and at least one different repeating unit with $NH_2$ or ammonium functionalization, the molar ratio of said units being in the range from 0.5-to-1 to 4-to-1, preferably 1-to-1 to 2-to-1. These polymers are suitable for incorporation into a surface treatment agent, such as a washing or cleaning agent, and lead to adhesion to surfaces, in particular to surfaces of textiles or surfaces of metal, glass, ceramic or plastic objects.

BACKGROUND OF THE INVENTION

To ensure cleanliness and hygiene, surfaces, particularly textile surfaces (such as fabric, clothing) or household surfaces (such as metal, glass, ceramic or plastics material surfaces) must be cleaned. The cleaning process must be effective and the cleaned surface of the textile or household item must have a flawless appearance after cleaning.

In order to increase the cleaning performance of a cleaning process, the possible re-accumulation of dirt from the cleaning or washing liquid on the surface of the substrate to be cleaned should be avoided during the cleaning process. For a flawless appearance of a clean surface, the staining or streaking often observed on hard surfaces after drying should also be prevented or reduced.

BRIEF SUMMARY OF THE INVENTION

It was therefore an object of the present invention to reduce the re-soiling of the surface during the washing process but also after the washing process during the usual use of the textile or of the household object.

It was previously known that, for example, the re-accumulation of dirt on surfaces and the formation of stains or streaks on hard surfaces can be reduced by using special polymers. For this purpose, the conventional polymers have to be incorporated into the washing or cleaning agents in a significant amount so that a noticeable effect occurs. More efficient polymers, which show good effects even when used in a reduced amount, are desirable.

It was also an object of the present invention to provide polymers which more efficiently reduce or prevent the disadvantages that occur in surface cleaning.

It has now been found that the polymers according to the invention that are defined below achieve the aforementioned object and are additionally able to adsorb to an improved extent from the aqueous cleaning or washing liquor onto a substrate surface, in particular onto textile surfaces or household surfaces. As a result, these polymers act particularly efficiently and the amount of polymers used can be kept low.

A first subject of the invention is therefore a polymer containing at least one repeating unit of formula (I) and at least one repeating unit of formula (II) and optionally further repeating units,

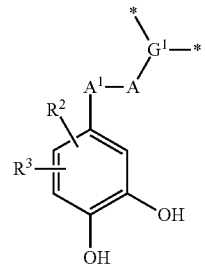

(I)

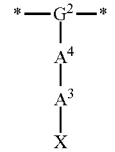

(II)

where
$G^1$ and $G^2$ independently of one another denote a structural unit which contributes to the polymer backbone,
A and $A^4$ independently of one another denote a spacer group of a side chain of the polymer or a direct bond,
$A^1$ denotes a linking group of the catechol radical from formula (I) to the spacer group A or a direct bond
$A^3$ denotes a linking group of the group X to the spacer group $A^4$ or a direct bond,
$R^2$ and $R^3$ independently of one another represent a hydrogen atom, a $C_1$-$C_4$-alkyl group, a $C_2$-$C_4$ hydroxyalkyl group, a $C_1$-$C_4$-alkoxy group, a halogen atom, a sulfonic acid group, a $C_1$-$C_{10}$-alkylcarbonyloxy group, a $C_1$-$C_{10}$-alkoxycarbonyl group, a $C_6$-$C_{10}$-aryloxycarbonyl group, a $C_6$-$C_{10}$-arylcarbonyloxy group, $C_2$-$C_{10}$-alkenylcarbonyloxy group, a $C_2$-$C_{10}$-alkenyloxycarbonyl group, a hydroxyl group, an amino group, an ammonium group,
X represents an amino group $—N(R^5)(R^6)$ or an ammonio group $—N^+(R^5)(R^6)(R^7)\ 1/n\ An^{n-}$, where $R^5$, $R^6$ and $R^7$ each independently represent a hydrogen atom, a $C_1$-$C_4$-alkyl group or a $C_2$-$C_4$ hydroxyalkyl group and $1/n\ An^{n-}$ is an equivalent of an n-valent anion, preferably with n=1,
with the proviso that the repeating units of the formula (II) are different from the repeating units of the formula (I) and the molar ratio of the units of the formula (I) to the units of the formula (II) is in the range from 0.5-to-1 to 4-to-1, preferably 1-to-1 to 2-to-1.

In various embodiments, it may be preferred that A and $A^1$ do not both denote a direct bond. Likewise, it may be preferred in various embodiments that $A^4$ and $A^3$ do not both denote a direct bond. This means that at least one of A and $A^1$ or one of $A^4$ and $A^3$ represents a spacer group.

A chemical bond marked with an * in a structural formula of a repeating unit represents a valence which, as a covalent bond, is a part of the polymer backbone.

The repeating units of formula (II) are different from the repeating units of formula (I). In particular, the repeating units of the formula (II) therefore contain no 1,2-dihydroxyphenyl group, which can be additionally substituted on the phenyl ring.

The polymer backbone is a continuous series of covalently bonded atoms that form the actual molecular chain as the "backbone" of a polymer. The parts of the molecule that do not form this actual chain, but are only bonded to it, do not belong to the polymer backbone.

In formulas (I) and (II), the radicals $G^1$ and $G^2$ each denote a structural unit which contributes to the polymer backbone. This means that the radicals $G^1$ and $G^2$ each represent the structural fragment responsible for the corresponding repeating unit, which makes the complete contribution of the repeating unit to the atoms constituting the polymer backbone and can also carry further radicals.

According to the above definition, $G^1$ of the formula (I) naturally contains, in addition to the contribution of the atoms constituting the polymer backbone, further side chains or atoms bonded thereto. Embodiments of $G^1$ are defined below.

In accordance with the above definition, $G^2$ of the formula (II) naturally contains, in addition to the contribution of the atoms constituting the polymer backbone, further side chains or atoms bonded thereto. Embodiments of $G^2$ are defined below.

A spacer group is a structural fragment of a side chain of a polymer that bridges the end group of the side chain (also: side chain terminus) with the polymer backbone.

Preferred are suitable polymers which are characterized in that A according to formula (I) represents a carbonyl group, a carbonyloxy group, a carbonylimino group, an imino group, a $C_1$-$C_4$-alkyleneoxy group or a $C_1$-$C_4$-alkyleneimino group. In various embodiments, A according to formula (I) represents a carbonyl group.

As a repeating unit of formula (II), those have proven themselves as preferred in which $A^4$ according to formula (II) represents a carbonyl group, a carbonyloxy group, a carbonylimino group, an imino group, a $C_1$-$C_4$-alkyleneoxy group, $C_1$-$C_4$-alkyleneimino group, a $C_1$-$C_4$-alkyleneiminocarbonyl group, $C_2$-$C_6$-α,ω-(dioxo)alkane-α, ω-diyl group. In various embodiments, $A^4$ according to formula (II) represents a carbonyl group.

A linking group is a structural fragment which, in a side chain of the repeating unit of a polymer, links a spacer group to the side chain terminus (for example 1,2-dihydroxyphenyl radical of the formula (I) or X of the formula (II)).

Preferred polymers according to the invention are characterized in that $A^1$ according to formula (I) represents a direct bond, a $C_1$-$C_4$-alkanediyl group or a $C_1$-$C_4$-alkyleneoxycarbonyl group. $A^1$ according to formula (I) is particularly preferably a $C_1$-$C_4$-alkanediyl group, in particular if A is a carbonyl group. These polymers particularly preferably contain the preferred spacer group A according to formula (I).

Preferred polymers according to the invention are characterized in that $A^3$ according to formula (II) represents a direct bond, a $C_1$-$C_6$-alkanediyl group or a $C_2$-$C_6$-α, ω-(Dioxo)alkan-α,ω-diyl group. $A^3$ according to formula (II) is particularly preferably a $C_1$-$C_6$-alkanediyl group, especially when $A^4$ is a carbonyl group. These polymers particularly preferably contain the preferred spacer group $A^4$ according to formula (II).

Unsymmetrical bivalent groups, in particular those of the radicals A, $A^1$, $A^3$, $A^4$ and $A^5$, can be introduced into the structures according to the invention of the repeating units of the formulas (I) and (II) of the polymer according to the invention (and their preferred embodiments) according to both options that are obtainable by rotation (e.g. ethyleneoxy as —OCH$_2$CH$_2$— or as —CH$_2$CH$_2$O—). It is preferred if the covalent linkage of two atoms other than carbon, for example the formation of a peroxy group (—OO—), is avoided.

A carbonylimino group is known to be a bivalent group

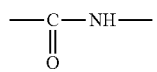

An imino group is known to be a bivalent group —NH—

A carbonyloxy group is known to be a bivalent group

Preferred $C_1$-$C_4$-alkyleneoxy groups are selected from methyleneoxy (—OCH$_2$— or —CH$_2$O—), ethyleneoxy (—OCH$_2$CH$_2$— or —CH$_2$CH$_2$O—), propyleneoxy (—OCH$_2$CH$_2$CH$_2$— or —OCH$_2$CHMe- or —CH$_2$CH$_2$CH$_2$O— or —CMeHCH$_2$O—), butyleneoxy (—OCH$_2$CH$_2$CH$_2$CH$_2$— or —OCH$_2$CH$_2$CHMe- or —OCH$_2$CHEt- or —CH$_2$CH$_2$CH$_2$CH$_2$O— or —CHMeCH$_2$CH$_2$O— or —CHEt-CH$_2$O—).

Preferred $C_1$-$C_4$-alkyleneimino groups are selected from methyleneimino (—NHCH$_2$— or —CH$_2$NH—), ethyleneimino (—NHCH$_2$CH$_2$— or —CH$_2$CH$_2$NH—), propyleneimino (—NHCH$_2$CH$_2$CH$_2$— or —NHCH$_2$CHMe- or —CH$_2$CH$_2$CH$_2$NH— or —CHMeCH$_2$NH—), butyleneimino (—NHCH$_2$CH$_2$CH$_2$CH$_2$— or —NHCH$_2$CH$_2$CHMe- or —NHCH$_2$CHEt- or —CH$_2$CH$_2$CH$_2$CH$_2$NH— or —CHMeCH$_2$CH$_2$NH— or —CHEtCH$_2$CH$_2$NH—).

Preferred $C_1$-$C_4$-alkyleneiminocarbonyl groups are selected from methyleneiminocarbonyl (—NHCH$_2$— or —CH$_2$NH—), ethyleneiminocarbonyl (—CONHCH$_2$CH$_2$— or —CH$_2$CH$_2$NHCO—), propyleneiminocarbonyl (—CONHCH$_2$CH$_2$CH$_2$— or —CONHCH$_2$CHMe- or —CH$_2$CH$_2$CH$_2$NHCO— or —CHMeCH$_2$NHCO—), butyleneimino (—CONHCH$_2$CH$_2$CH$_2$CH$_2$— or —CONHCH$_2$CH$_2$CHMe- or —CONHCH$_2$CHEt- or —CH$_2$CH$_2$CH$_2$CH$_2$NHCO— or —CHMeCH$_2$CH$_2$NHCO— or —CHEtCH$_2$CH$_2$NHCO—).

Preferred $C_1$-$C_4$-alkyl groups are selected from methyl, ethyl, n-propyl, isopropyl, n-butyl, sec-butyl, iso-butyl or tert-butyl.

Preferred $C_2$-$C_4$ hydroxyalkyl groups are selected from 2-hydroxyethyl, 3-hydroxypropyl, 2-hydroxypropyl, 4-hydroxybutyl, 3-hydroxybutyl or 2-hydroxybutyl.

Preferred $C_1$-$C_4$-alkoxy groups are selected from methoxy, ethoxy, n-propoxy, iso-propoxy, n-butoxy, sec-butoxy, iso-butoxy or tert-butoxy.

Preferred halogen atoms are selected from chlorine, bromine or fluorine.

Preferred $C_1$-$C_{10}$-alkylcarbonyloxy groups are selected from CH$_3$—CO—O—, CH$_3$CH$_2$CO—O— or CH$_3$CH$_2$CH$_2$CO—O—.

Preferred $C_1$-$C_{10}$-alkoxycarbonyl groups are selected from methoxycarbonyl, ethoxycarbonyl, n-propoxycarbonyl, iso-propoxycarbonyl, n-butoxycarbonyl, sec-butoxycarbonyl, iso-butoxycarbonyl, tert-butoxycarbonyl, hexyloxycarbonyl, 2-ethylhexyloxycarbonyl or octyloxycarbonyl.

Preferred $C_6$-$C_{10}$-aryloxycarbonyl groups are selected from phenoxycarbonyl, 2-methylphenoxycarbonyl, 3-methylphenoxycarbonyl or 4-methylphenoxycarbonyl.

Preferred $C_6$-$C_{10}$-arylcarbonyloxy groups are selected from phenylcarbonyloxy (also: benzoyloxy), 2-methylphenylcarbonyloxy, 3-methylphenylcarbonyloxy or 4-methylphenylcarbonyloxy.

Preferred $C_2$-$C_{10}$-alkenylcarbonyloxy groups are selected from CH$_2$=CH—CH$_2$—CO—O—, CH$_2$=CH—CO—O— or CH$_2$=CMe-CO—O—.

A preferred $C_2$-$C_{10}$-alkenyloxycarbonyl group is allyloxycarbonyl or vinyloxycarbonyl.

Preferred $C_1$-$C_4$-alkanediyl groups are selected from methylene, ethane-1,2-diyl, propane-1,2-diyl, propane-1,3-diyl, butane-1,4-diyl, butane-1,2-diyl or butane-1,3-diyl.

$C_1$-$C_4$-alkyleneoxycarbonyl groups are bivalent groups which have a free valence on the alkylene structural unit and a free valence on the carbonyl group. Preferably, $C_1$-$C_4$-alkyleneoxycarbonyl groups are selected from methyleneoxycarbonyl (—$CH_2$—O—CO— or —CO—O—$CH_2$—), ethyleneoxycarbonyl (—$CH_2$—$CH_2$—O—CO— or —O—CO—$CH_2$—$CH_2$—), propyleneoxycarbonyl (—$CH_2$—$CH_2$—$CH_2$—O—CO— or —CO—O—$CH_2$—$CH_2$—$CH_2$—), butyleneoxycarbonyl (—$CH_2$—$CH_2$—$CH_2$—$CH_2$—O—CO— or —CO—O—$CH_2$—$CH_2$—$CH_2$—$CH_2$—).

A $C_2$-$C_6$-α,ω-(dioxo)alkane-α,ω-diyl group is a $C_2$-$C_6$-alkanediyl group which carries an oxo group at the terminus

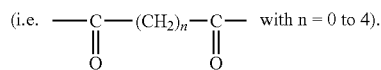

(i.e. —C—($CH_2$)$_n$—C— with n = 0 to 4).

Preferred $C_2$-$C_6$-α,ω-(dioxo)alkane-α,ω-diyl groups are selected from 1,3-dioxopropane-1,3-diyl, 1,4-dioxobutane-1,4-diyl, 1,5-dioxopentane-1,5-diyl or 1,6-dioxohexane-1,6-diyl.

The polymers according to the invention can be built up by polyreaction from appropriately catechol-functionalized monomers or appropriately $XA^3$-$A^4$-functionalized monomers, or can be obtained as a starting material by polymer-analogous reaction with a polymer and a reagent containing catechol or a group X as starting material. It is preferred according to the invention if $G^1$ according to formula (I) and $G^2$ according to formula (II) contribute to a polymer backbone which is selected from a polymer backbone which can be obtained by polyaddition, polycondensation or by free-radical polymerization. The polymer backbone of the polymer according to the invention is particularly preferably derived from polyamide, polyacrylate, polymethacrylate, polyurethane, polyurea, polyalkylene oxide, polysaccharide, polyester, polyynyl, polyalkyleneimine, or copolymers thereof. Examples of mixed copolymers are polyamides from polyalkyleneimines and dicarboxylic acids, polyalkoxylated polyalkyleneimine, polyester polyurethane and polyether polyurethane.

Polymers in which the amount of the units of the formula (I) and of the formula (II) is at least 50 mol %, in relation to all repeating units contained in the polymer have proven to be particularly successful and therefore preferred polymers.

Polymers according to the invention which are characterized in that they have an average molecular weight (Mw) of 500 to 500,000 g/mol, preferably of 2,000 to 200,000 g/mol, are preferred.

The average molar masses specified for polymeric ingredients in the context of this application are always, unless explicitly stated otherwise, weight-average molar masses $M_w$, which can in principle be determined by means of gel permeation chromatography using an RI detector, where the measurement is expediently carried out as per an external standard.

If, in the context of the application, numerical ranges are defined from one number to another number, then the limit values are included in the range.

If, in the context of the application, numerical ranges are defined between one number and another number, then the limit values are not included in the range.

Suitable repeating units of the formula (I) having the said 1,2-dihydroxyphenyl side chain terminus are preferably those in which $R^2$ and $R^3$ in formula (I) represent a hydrogen atom.

In a very particularly preferred embodiment of the polymers according to the invention, the polymer backbone of the polymer according to the invention is derived from polyamide. Polyamide-based polymers according to the invention can preferably be represented using common protective group chemistry (for amino groups, for example: triphenylmethyl (trityl), (((9H-fluoren-9-yl) methoxy) carbonyl (Fmoc); for phenolic OH, for example: methoxy, ketal).

The introduction and removal of the aforementioned protective groups is known to the person skilled in the art, in particular for trityl on amino groups from Hans-Dieter Jakubke, Hans Jeschkeit: Aminosäuren, Peptide, Proteine [Amino acids, Peptides and Proteins], Verlag Chemie, Weinheim, pp. 130-131, 1982 (ISBN 3-527-25892-2), for Fmoc on amino groups from E. Atherton, C. Bury, R. C. Sheppard, and B. J. Williams, Tetrahedron Lett., 3041, (1979) for methoxy on phenolic hydroxyl groups from Kiso, Yoshiaki et al., "Deprotection of O-methyltyrosine by a 'push-pull' mechanism using the thioanisole-trifluoromethanesulphonic acid system. Application to the convenient synthesis of a potent N-methylene kephalin derivative" in the Journal of the Chemical Society, Chemical Communications 21 (1979), 971-972, for ketal and phenolic hydroxyl groups from K. Ogura and G.-i. Tsuchihashi, Tetrahedron Lett., 3151 (1971). Reference is made expressly and in full to the aforementioned publications.

In various embodiments of the invention, $G^1$ of the formula (I) and/or $G^2$ of the formula (II) are groups derived from polyamide and/or are derived from reaction products of dicarboxylic acids, in particular those of the formula HOOC—Z—COOH or HOOC—$Z^1$—COOH, with polyamines (which carry the functional side chains of the repeating units of the formula (I) and (II)), in particular a correspondingly functionalized triamine, such as, for example, diethylene triamine. In various embodiments, these groups $G^1$ and $G^2$ have the formula *—(C=O)—Z—(C=O)—NR'—$CH_2CH_2$—(N-radical)-$CH_2CH_2$—NR'—* or *—(C=O)—$Z^1$—(C=O)—NR'—$CH_2CH_2$—(N-radical)-$CH_2CH_2$—NR'—*, where R' denotes H or $C_1$-$C_4$-alkyl, Z and $Z^1$ are as defined below and "radical" in each case denotes the radical of the repeating unit according to formula (I) or (II) that is bonded via A or $A^4$.

It has proven to be preferable according to the invention if the polymer according to the invention contains at least one repeating unit of the formula (I-a) as the repeating unit of the formula (I),

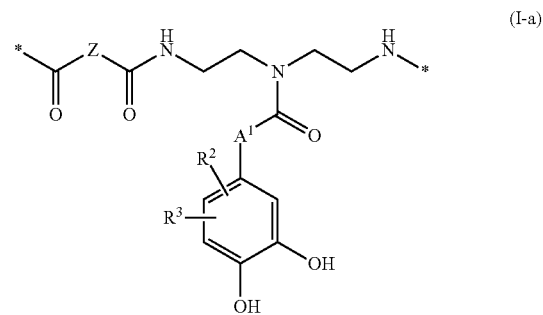

(I-a)

where
A¹ represents a $C_1$-$C_4$-alkanediyl group (preferably ethane-1,2-diyl),
Z represents a $C_2$-$C_8$-alkanediyl group (preferably ethane-1,2-diyl),
R² and R³ independently of one another represent a hydrogen atom, a $C_1$-$C_4$-alkyl group, a $C_2$-$C_4$ hydroxyalkyl group, a $C_1$-$C_4$-alkoxy group, a halogen atom, a sulfonic acid group (preferably in each case a hydrogen atom).

Corresponding repeating units of the formula (I-a) are derived from formula (I) in which A according to formula (I) denotes a carbonyl group which binds to the spacer group A¹ and to G¹.

In a particularly preferred repeating unit of the formula (I-a), in formula (I-a) R² and R³ represent a hydrogen atom, A¹ and Z represent an ethane-1,2-diyl group. This special repeating unit is abbreviated below with *-(Cat)-*.

The monomers corresponding to formula (I-a) for the synthesis of the polymers according to the invention can be produced using the following synthesis method:
(i) Protection of both primary amino groups of a diethylene triamine with protective groups S¹ and S² which may be the same or different, preferably different, in particular for triphenylmethyl or (((9H-fluoren-9-yl) methoxy) carbonyl;
(ii) Functionalization of the secondary amino group of the protected diethylenetriamine from (i) with a compound of the formula (E1)

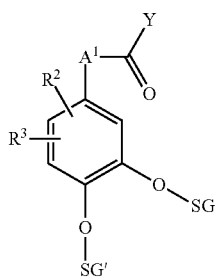

(E1)

where
A¹, R² and R³ are as defined in formula (I-a),
Y represents a chlorine atom, a bromine atom, an iodine atom or a hydroxyl group,
SG and SG' represent a protective group, preferably methyl, while obtaining the reaction product of the formula (U1)

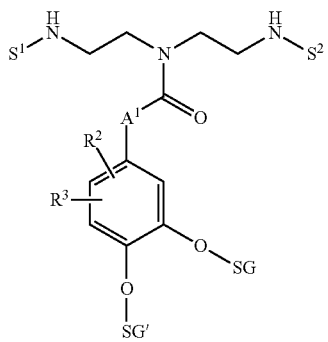

(U1)

where
A¹, R² and R³ are as defined in formula (I-a),
SG and SG' are as defined in formula (E1),
S¹ and S² independently of one another each represent a protective group, which may be the same or different, preferably different, in particular triphenylmethyl or (((9H-fluoren-9-yl) methoxy) carbonyl;
(iii) Removal of a protective group S¹ or S² from the functionalized diethylenetriamine of the formula (U1),
(iv) Reaction of the deprotected diethylenetriamine from (iii) with a compound of the formula (E2) or its anhydride,

(E2)

where Z is as defined in formula (I-a),
while obtaining the reaction product of the formula (U2)

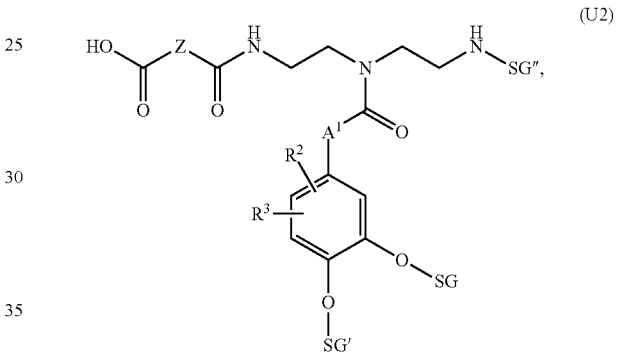

(U2)

where
A¹, R², R³ and Z are as defined in formula (I-a),
SG and SG' is as defined in formula (E1),
SG" is defined as S¹ or S² according to formula (U1),
(v) Removal of the protective group SG" from the reaction product (U2) while obtaining the compound (U3)

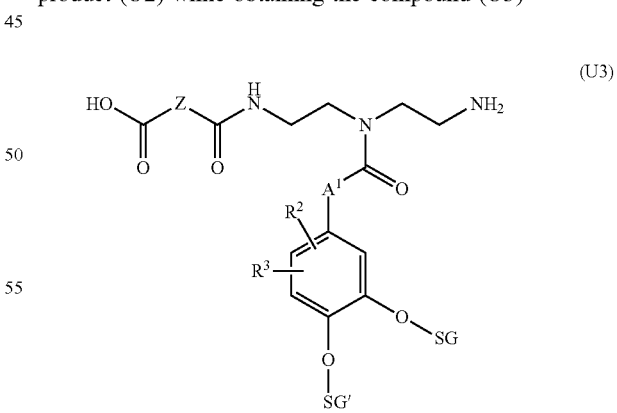

(U3)

where
A¹, R², R³ and Z are as defined in formula (I-a),
SG and SG' is as defined in formula (E1).

If the polymer is built up on a solid phase, it is preferred to couple reaction product from (iv) to the solid phase and then to carry out step (v).

BRIEF DESCRIPTION OF THE DRAWINGS

FIG. 3A illustrates the analysis of the adhesion of a polymer having two catechol units to a glass surface;

FIG. 3B illustrates the analysis of the adhesion of a polymer having two catechol units to a D-cellobiose surface.

DETAILED DESCRIPTION OF THE INVENTION

Figure 1:
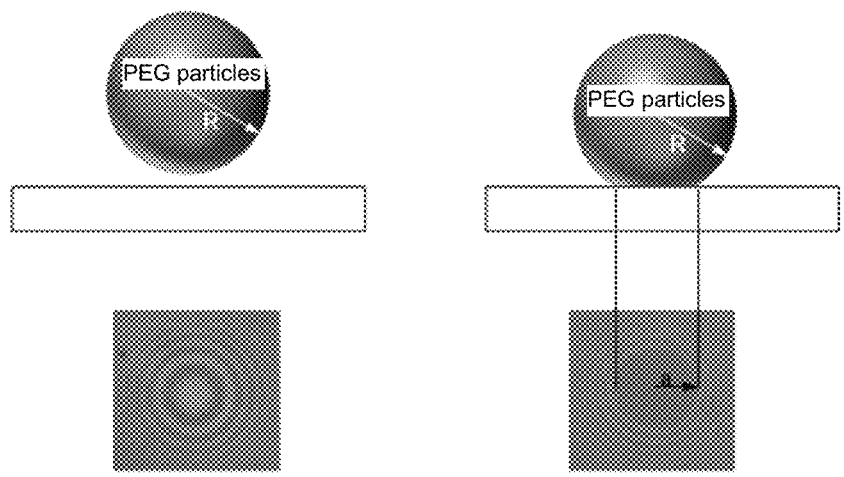
FIG. 1 shows the measurement of the radii of the contact surface and the particles with respect to the JKR Model.

A synthesis example of the aforementioned synthesis route is illustrated in FIG. 1 and described in detail in the example section.

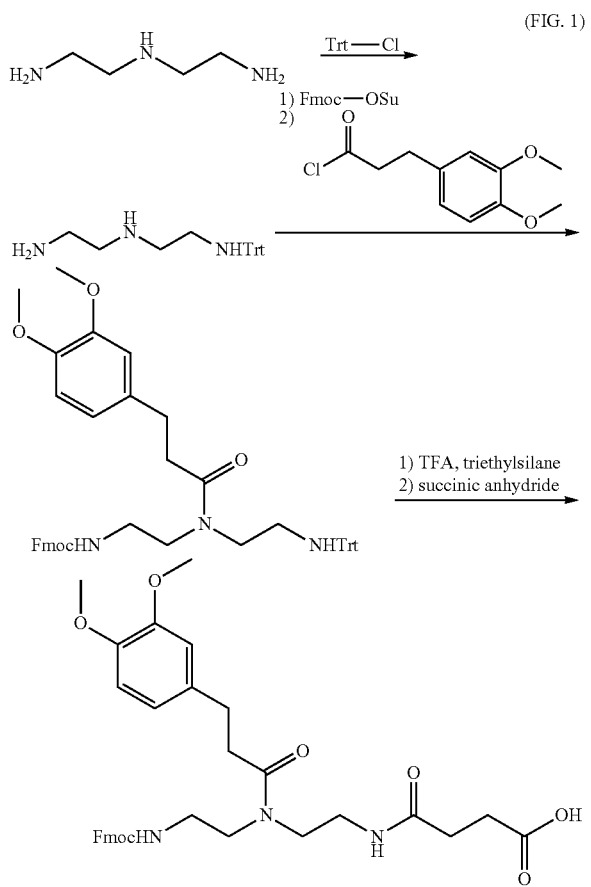

(FIG. 1)

If the hydroxyl groups on the catechol skeleton of the repeating unit of the formula (I) or (I-a) are provided with protective groups (for example methyl), these protective groups are preferably removed again after the polyreaction has taken place, while the polymers having the catechol structural fragment of the formula (I) or of the formula (I-a) are formed.

Successful removal of methyl protective groups from hydroxyl groups which bind directly to aromatics can be achieved according to Kiso, Yoshiaki et al., "Deprotection of O-methyltyrosine by a 'push-pull' mechanism using the thioanisole-trifluoromethanesulphonic acid system. Application to the convenient synthesis of a potent N-methylenkephalin derivative" in the Journal of the Chemical Society, Chemical Communications 21 (1979), 971-972 by reaction (preferably of the polymer to be deprotected) with trifluoromethanesulfonic acid in trifluoroacetic acid (TFA) in the presence of thioanisole. Reference is made expressly and in full to the aforementioned publication. The compound to be deprotected (preferably the polymer to be deprotected) is preferably shaken for 18 hours relative to the reaction conditions of Kiso in a solution of trifluoromethanesulfonic acid (18 molar equivalents per catechol), thioanisole (8 molar equivalents per catechol) and trifluoroacetic acid (95% by volume of the total solution). Then, the reaction solution is mixed with diethyl ether, the reaction product is precipitated, and the isolated precipitate is dried under vacuum.

It is preferred according to the invention if the polymers according to the invention contain at least one repeating unit of the formula (II-a) as the repeating unit of the formula (II),

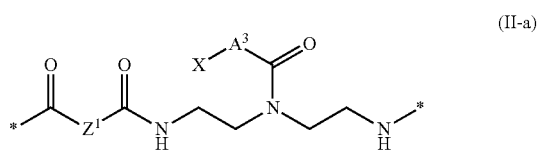

(II-a)

where $A^3$ represents a $C_1$-$C_6$-alkanediyl group, $Z^1$ represents a $C_2$-$C_8$-alkanediyl group (preferably ethane-1,2-diyl), X represents an amino group —$N(R^5)(R^6)$ or an ammonio group —$N^+(R^5)(R^6)(R^7)$ $1/n\,An^{n-}$, where $R^5$, $R^6$ and $R^7$ each independently of one another represent a hydrogen atom, a $C_1$-$C_4$-alkyl group or a $C_2$-$C_4$ hydroxyalkyl group and $1/n\,An^{n-}$ is an equivalent of an n-valent anion, preferably with n=1.

Corresponding repeating units of the formula (II-a) are derived from formula (II) in which the spacer group $A^4$ according to formula (II) denotes a carbonyl group which binds to the linking group $A^3$ and to $G^2$.

The monomers corresponding to formula (II-a) for the synthesis of the polymers according to the invention can be produced using the following synthesis method:

(i) Protection of both primary amino groups of a diethylene triamine with protective groups $S^1$ and $S^2$, which may be the same or different, preferably different, in particular triphenylmethyl or (((9H-fluoren-9-yl)methoxy) carbonyl;

(ii) Functionalization of the secondary amino group of the protected diethylenetriamine from (i) with a compound of the formula (E3)

(E3)

where
X and $A^3$ are as defined in formula (II-a),
while obtaining the reaction product of the formula (U4)

(U4)

where
X and $A^3$ are as defined in formula (II-a),
$S^1$ and $S^2$ independently of one another each represent a protective group, which may be the same or different, preferably different, in particular triphenylmethyl or (((9H-fluoren-9-yl) methoxy) carbonyl;
(iii) Removal of a protective group $S^1$ or $S^2$ from the functionalized diethylenetriamine of the formula (U4),
(iv) Reaction of the deprotected diethylenetriamine from (iii) with a compound of the formula (E5) or its anhydride, (E5)

where $Z^1$ is as defined in formula (II-a),
while obtaining the reaction product of the formula (U5)

(U5)

where
X, $Z^1$ and $A^3$ are as defined in formula (II-a),
SG''' is defined as $S^1$ or $S^2$ according to formula (U4),
(v) Removal of the protective group SG''' from the reaction product (U5) while obtaining the compound (U6)

(U6)

where
X, $A^3$ and $Z^1$ are as defined in formula (II-a).

If the polymer is built up on a solid phase, it is preferred to couple reaction product from (iv) to the solid phase and then to carry out step (v).

A synthesis example of the aforementioned synthesis route is described in detail in the example section.

It has also proven to be preferable according to the invention if the polymer according to the invention contains at least one repeating unit of the formula (II-b) as the repeating unit of the formula (II), (II-b)

where $A^6$ represents a ($C_2$ to $C_6$)-alkanediyl group, in particular ethane-1,2-diyl, propane-1,3-diyl, butane-1,4-diyl, propane-1,2-diyl, butane-1,2-diyl, butane-1,3-diyl, pentane-1,5-diyl or hexane-1,6-diyl,
$Z^3$ represents a $C_2$-$C_8$-alkanediyl group (preferably ethane-1,2-diyl).

The repeating unit of the formula (II-b) is derived from the repeating unit of the formula (II) in which the linking group $A^3$ is a direct bond and the spacer group $A^4$ is a $C_2$-$C_6$-α,ω-(dioxo)alkane-α,ω-diyl group and X is an $NH_2$ group.

As the repeating unit of the formula (II), the polymer can contain the repeating unit of the formula (II-b) alone or together with the repeating unit of the formula (II-a). Particularly preferred polymers according to the invention therefore contain at least one repeating unit of the formula (I-a) and at least one repeating unit of the formula (II-a) and/or of the formula (II-b).

The monomers corresponding to formula (II-b) for the synthesis of the polymers according to the invention can be produced using the following synthesis method:
(i) Protection of both primary amino groups of a diethylene triamine with protective groups $S^1$ and $S^2$, which may be the same or different, preferably different, in particular triphenylmethyl or (((9H-fluoren-9-yl) methoxy) carbonyl;
(ii) Functionalization of the secondary amino group of the protected diethylenetriamine from (i) compound of the formula (E6) or its anhydride, (E6)

wherein $A^6$ is as defined in formula (II-b) while obtaining the reaction product of the formula (U7)

(U7)

where
$A^6$ is as defined in formula (II-b),
$S^1$ and $S^2$ independently of one another each represent a protective group, which may be the same or different, preferably different, in particular triphenylmethyl or (((9H-fluoren-9-yl) methoxy) carbonyl;

(iii) Removal of a protective group $S^1$ or $S^2$ from the functionalized diethylenetriamine of the formula (U7), (iv) Reaction of the deprotected diethylenetriamine from (iii) with a compound of the formula (E7), of the formula (E8) or in each case its acid halide,

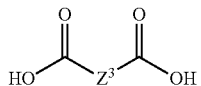
(E7)

wherein $Z^4$ represents a $C_2$-$C_8$-alkanediyl group (preferably ethane-1,2-diyl), while obtaining the reaction product of the formula (U8)

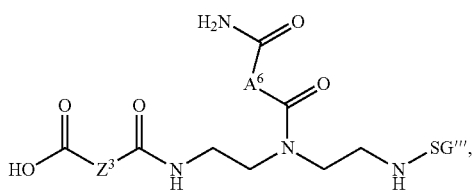
(U8)

where $Z^3$ is as defined in formula (U7), $Z^4$ is as defined in formula (E7),

SG''' is defined as $S^1$ or $S^2$ according to formula (U7) and preferably denotes (((9H-fluoren-9-yl) methoxy) carbonyl, (v) Removal of the protective group SG''' from the reaction product (U8) while obtaining the compound (U9)

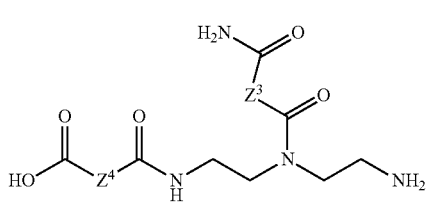
(U9)

where $Z^3$ and $Z^4$ are as defined in formula (U8).

If the polymer is built up on a solid phase, it is preferable to couple reaction product from (U8) with the solid phase. It is also conceivable to couple reaction product (U2) with the solid phase and to obtain a polymer chain containing at least one protected primary amino group (preferably at least one with triphenylmethyl-protected primary amino group) in the polymer, in which before or after cleavage from the solid phase the protected primary amino group is deprotected in one step and the resulting group is reacted with a compound of the formula (E3) (see above) or (E6) (see above).

A synthesis example of the aforementioned synthesis route is described in detail in the example section.

It is preferable according to the invention if the polymers according to the invention contain at least one repeating unit of the formula (II-c) as the repeating unit of the formula (II),

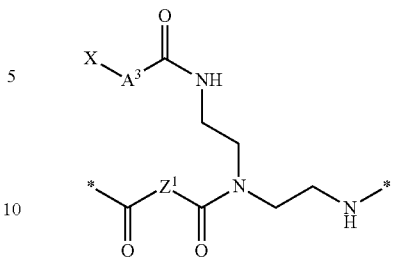
(II-c)

where $A^3$ represents a $C_1$-$C_6$-alkanediyl group, $Z^1$ represents a $C_2$-$C_8$-alkanediyl group (preferably ethane-1,2-diyl), X represents an amino group —$N(R^5)(R^6)$ or an ammonio group —$N^+(R^5)(R^6)(R^7)$ $1/n\, An^{n-}$, wherein $R^5$, $R^6$ and $R^7$ each independently represent a hydrogen atom, a $C_1$-$C_4$-alkyl group or a $C_2$-$C_4$ hydroxyalkyl group and $1/n\, An^{n-}$ denotes an equivalent of an n-valent anion, preferably with n=1.

Corresponding repeating units of the formula (II-c) are derived from formula (II) in which the spacer group $A^4$ according to formula (II) is a $C_2$-alkylaminocarbonyl group which binds to the linking group $A^3$ and to $G^2$.

In a preferred repeating unit of the formula (II-c) $Z^1$ represents an ethane-1,2-diyl group, $A^3$ a propane-1,3-diyl group and X an N, N-dimethylamino group. This special preferred structural unit is abbreviated below with *-(IIc-amine)-*.

The monomers corresponding to formula (II-c) for the synthesis of the polymers according to the invention can be produced using the following synthesis method:

(i) Protection of both primary amino groups of a diethylene triamine with protective groups $S^1$ and $S^2$, which may be the same or different, preferably different, in particular triphenylmethyl or (((9H-fluoren-9-yl)methoxy) carbonyl;

(ii) Functionalization of the secondary amino group of the protected diethylenetriamine from (i) with a compound of the formula (E8)

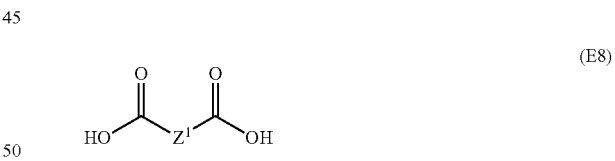
(E8)

where $Z^1$ are as defined in formula (II-c), while obtaining the reaction product of the formula (U10)

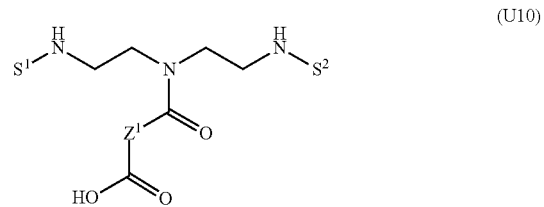
(U10)

where $Z^1$ are as defined in formula (II-c), $S^1$ and $S^2$ independently of one another each represent a protective group, which may be the same or different, preferably different, in particular triphenylmethyl or (((9H-fluoren-9-yl) methoxy) carbonyl;

(iii) Removal of a protective group $S^1$ or $S^2$ from the functionalized diethylenetriamine of the formula (U10), (iv) Reaction of the deprotected diethylenetriamine from (iii) with a compound of the formula (E9) or its anhydride,

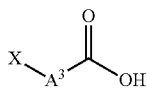
(E9)

X and $A^3$ are as defined in formula (II-c), while obtaining the reaction product of the formula (U11)

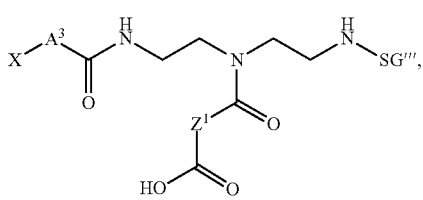
(U11)

where

X, $Z^1$ and $A^3$ are as defined in formula (II-c),

SG''' as $S^1$ or $S^2$ are defined according to formula (U10), (v) Removal of the protective group SG''' from the reaction product (U11) while obtaining the compound (U12)

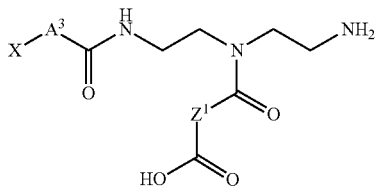
(U12)

where

X, $A^3$ and $Z^1$ are as defined in formula (II-c).

If the structure of the polymer takes place on a solid phase, it is preferable in the polymer synthesis to couple reaction product (U11) from (iv) with the solid phase and then to carry out step (v) for deprotection on the solid phase.

It has also proven to be preferable according to the invention if the polymer according to the invention contains at least one repeating unit of the formula (II-d) as the repeating unit of the formula (II),

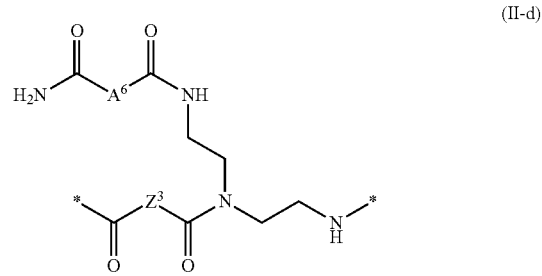
(II-d)

where $A^6$ represents a ($C_2$ to $C_6$)-alkanediyl group, in particular ethane-1,2-diyl, propane-1,3-diyl, butane-1,4-diyl, propane-1,2-diyl, butane-1,2-diyl, butane-1,3-diyl, pentane-1,5-diyl or hexane-1,6-diyl, $Z^3$ represents a $C_2$-$C_8$-alkanediyl group (preferably ethane-1,2-diyl).

The repeating unit of the formula (II-d) is derived from the repeating unit of the formula (II) in which the linking group $A^3$ is a $C_2$-$C_6$-α,ω-(dioxo)alkane-α,ω-diyl group and spacer group $A^4$ is a $C_2$-alkylimine group and X is an $NH_2$ group.

In a preferred repeating unit of the formula (II-d) $Z^3$ represents an ethane-1,2-diyl group and $A^6$ represents an ethane-1,2-diyl group. This special preferred structural unit is abbreviated below with *-(IId-amide)-*.

The polymer may contain as the repeating unit of formula (II) the repeating unit of formula (II-d) alone or together with at least one repeating unit selected from formula (II-a), formula (II-b), formula (II-c) or mixtures thereof.

The monomers corresponding to formula (II-d) for the synthesis of the polymers according to the invention can be produced using the following synthesis method:

(i) Protection of both primary amino groups of a diethylene triamine with protective groups $S^1$ and $S^2$, which may be the same or different, preferably different, in particular triphenylmethyl or (((9H-fluoren-9-yl)methoxy) carbonyl;

(ii) Functionalization of the secondary amino group of the protected diethylenetriamine from (i) compound of the formula (E10) or its anhydride,

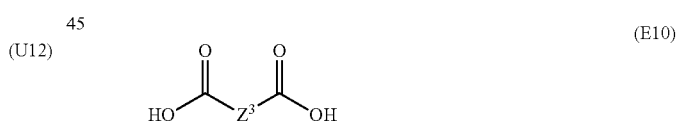
(E10)

wherein $A^6$ is as defined in formula (II-d) while obtaining the reaction product of the formula (U13)

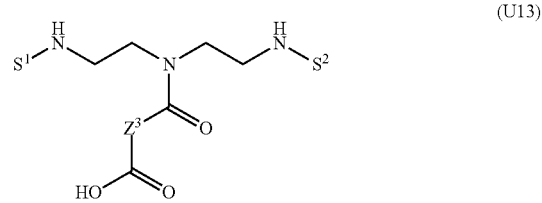
(U13)

where $Z^3$ is as defined in formula (II-d), $S^1$ and $S^2$ independently of one another each represent a protective group, which may be the same or different, preferably different, in particular triphenylmethyl or (((9H-fluoren-9-yl) methoxy) carbonyl;
(iii) Removal of a protective group $S^1$ or $S^2$ from the functionalized diethylenetriamine of the formula (U13),
(iv) Reaction of the deprotected diethylenetriamine from (iii) with a compound of the formula (E11), the formula (E8) or in each case its acid halide or anhydride

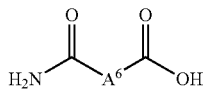 (E11)

where $A^6$ represents a $C_2$-$C_8$-alkanediyl group (preferably ethane-1,2-diyl),
while obtaining the reaction product of the formula (U14)

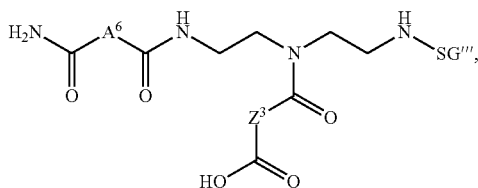 (U14)

where
$Z^3$ is as defined in formula (II-d),
$A^6$ is as defined in formula (E11),
SG''' is defined as $S^1$ or $S^2$ according to formula (U13), preferably (((9H-fluoren-9-yl) methoxy) carbonyl,
(v) Removal of the protective group SG''' from the reaction product (U14) while obtaining the compound (U15)

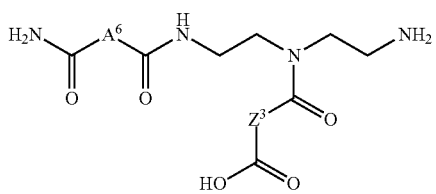 (U15)

where
$Z^3$ and $A^6$ are as defined in formula (U14).

If the polymer is built up on a solid phase, it is preferred to couple reaction product from (U14) with the solid phase. It is also conceivable to couple reaction product (U13) with the solid phase and to obtain a polymer chain containing at least one protected primary amino group (preferably at least one triphenylmethyl-protected primary amino group) in the polymer, in which before or after cleavage from the solid phase the protected primary amino group is deprotected in one step and the resulting group is reacted with a compound of the formula (E9) (see above) or (E11) (see above).

A synthesis example of the aforementioned synthesis route is described in detail in the example section.

Particularly preferred polymers according to the invention contain at least one repeating unit of the formula (I-a) combined with at least one repeating unit of the formula (II-a) and/or the formula (II-b) and/or the formula (II-c) and/or the formula (II-d). It is particularly preferred if the polymers according to the invention contain at least one repeating unit of the formula (I-a) combined with at least one repeating unit of the formula (II-c) and/or of the formula (II-d).

However, with a view to solving the problem, it has also been found for improved incorporation of the polymer into aqueous surface treatment agents that preferred polymers according to the invention are characterized in that they contain as the (preferably only) further repeating unit at least one structural unit of the formula (III),

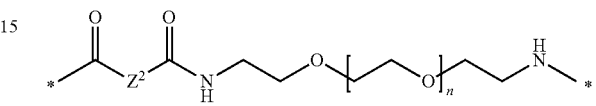 (III)

where n is a number from 1 to 10 and $Z^2$ represents a $C_2$ to $C_8$-alkanediyl group (preferably ethane-1,2-diyl). It is again preferred if the polymer contains the repeating units according to formula (III) in an amount of less than 50 mol %.

In a preferred repeating unit of the formula (III), $Z^2$ represents an ethane-1,2-diyl group and n represents 1. This special preferred repeating unit is abbreviated below with *-(EDS)-*.

The monomers corresponding to formula (III) for the synthesis of the preferred polymers according to the invention were produced by the synthesis method described in Ebbesen, M F, et al. "Biodegradable poly(amidoamine)s with uniform degradation fragments via sequence-controlled macromonomers," Polymer Chemistry 7.46 (2016), pages 7086-7093 and the synthesis method described in "Sequence-defined glycopolymer segments presenting mannose: synthesis and lectin binding affinity." Biomacromolecules 13.6 (2012): 1845-1852 in the "Supporting Information." Reference is made expressly and in full to the aforementioned publications.

Very particularly preferred polymers according to the invention contain
(a) at least one repeating unit of the formula (I-a) and
(b) (b) at least one repeating unit of the formula (II-a) and/or the formula (II-b) and/or the formula (II-c) and/or the formula (II-d) and
(c) at least one repeating unit of the formula (III).

The polymers derived from polyamide can be prepared from the monomers by polyreaction, in this case polycondensation, in the manner known to the person skilled in the art. The polymers derived from polyamide are synthesized on the solid phase to represent polymers having a defined macrostructure, such as block copolymers or another defined sequence of the structural units according to the invention, and to strategically set the molar ratio of the repeating units according to the invention. For this purpose, in a preferred synthesis variant a solid phase with free amino groups is provided that is reacted sequentially to build up a polymer with monomers or prepolymers with protected amino groups, preferably with Fmoc-protected amino groups, and the protective group of the coupled monomer is removed again before the next reaction with a monomer while obtaining an amino group. A corresponding protocol for a preferred solid phase synthesis is described in Gerke, Christoph, et al. "Sequence-controlled glycopolymers via step-growth polymerization of precision glycomacromolecules for lectin receptor clustering." Biomacromolecules 18.3 (2017), pages 787-796. In this context, reference is made expressly and fully to this document. Suitable monomers that can be used for solid-phase synthesis and in particular for solid-phase synthesis according to the aforementioned protocol, are preferably a reaction product used as a monomer of the above formula (U2), the above formula (U5), the above formula (U8), the above formula (U11), the above formula (U13), the above formula (U14) or monomers for the synthesis of the repeating unit of the above formula (III).

In a very particularly preferred embodiment of the polymers according to the invention, the polymer backbone of the polymer according to the invention is derived from acrylates, methacrylates, acrylamides, methacrylamides, or copolymers thereof. Appropriate polymers can be formed by radical polyreaction.

Preferred polymers according to the invention are characterized in that they contain at least one repeating unit of the formula (Ic) as the repeating unit of the formula (I),

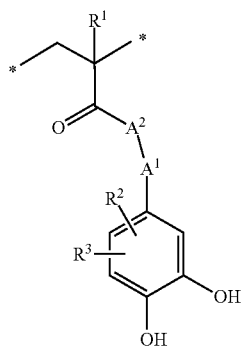

(I-c)

where
$R^1$ represents a hydrogen atom or a methyl group,
$A^2$ represents an oxygen atom or a group —NH—, preferably a group —NH—,
$R^2$, $R^3$, and $A^1$ are as defined in formula (I).

The monomers corresponding to formula (I-c) for the synthesis of the polymers according to the invention are known from the literature and can be produced, for example, according to the synthesis instructions as per publication WO 2005/070866 A2 (in this case, inter alia: 2-(3,4-dihydroxyphenyl) ethyl acrylate, 2-(3,4-dihydroxyphenyl) ethyl methacrylate, 2-(3,4-dihydroxy-6-methylphenyl) ethyl methacrylamide) or U.S. Pat. No. 6,605,270 A or according to Na Lin et al., Nucleic Acids Research, Volume 35, Issue 4, 2007, pages 1222-1229 (in this case: N-[2-(3,4-dihydroxyphenyl)-ethyl]-acrylamide). Reference is expressly and fully made to these documents.

Polymers preferred according to the invention (in particular those which contain at least one repeating unit of the formula (I-c)) contain at least one repeating unit of the formula (II-e) as the repeating unit of the formula (II),

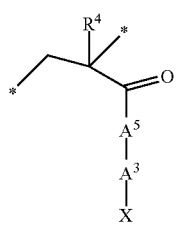

(II-e)

where
$R^4$ represents a hydrogen atom or a methyl group,
$A^5$ represents an oxygen atom or a group —NH—,
$A^3$ represents a $C_2$-$C_6$-alkanediyl group,
X represents an amino group —N($R^5$)($R^6$) or an ammonio group —N$^+$($R^5$)($R^6$)($R^7$) 1/n $An^{n-}$, where $R^5$, $R^6$ and $R^7$ each independently of one another represent a hydrogen atom, a $C_1$-$C_4$-alkyl group or a $C_2$-$C_4$ hydroxyalkyl group and 1/n $An^{n-}$ is an equivalent of an n-valent anion, preferably with n=1.

Repeating units of the formula (II-e) in which the radicals $R^5$, $R^6$ and $R^7$ each represent a methyl group are particularly preferred.

Very particularly preferred polymers according to the invention (in particular those which contain at least one repeating unit of the formula (I-c)) contain as the repeating unit of the formula (II) at least one repeating unit of the formula (II-f) or its trimethylammonium salt or at least one repeating unit of the formula (II-g) or mixtures thereof,

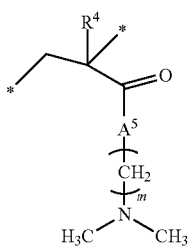

(II-f)

where
$R^4$ represents a hydrogen atom or a methyl group,
$A^5$ represents an oxygen atom or a group —NH—,
m represents 2 or 3;

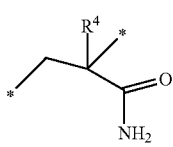

(II-g)

where
$R^4$ represents a hydrogen atom or a methyl group.

It has proven to be preferable if polymers according to the invention (in particular those which have at least one repeating unit of the formula (I-e) and at least one repeating unit of the formula (II), selected from the formula (II-f), (II-g) or mixtures thereof are included), characterized in that they contain as (preferably the only) further repeating unit at least one structural unit of the formula (IV),

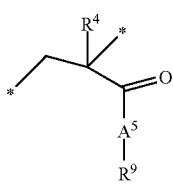

(IV)

where
R⁸ represents a hydrogen atom or a methyl group,
A⁵ represents an oxygen atom or a group —NH—,
R⁹ represents a hydroxy-terminated polyalkylene oxide group, a $C_1$-$C_4$-alkyl-terminated polyalkylene oxide group, a $C_2$-$C_6$ hydroxyalkyl group, a $C_3$-$C_6$ polyhydroxyalkyl group, a $C_1$-$C_6$-alkyl group, a $C_1$-$C_4$-alkoxy-$C_2$-$C_4$-alkyl group, a 2-hydroxyethyl group, a 2-hydroxypropyl group, a 2-methyl-1-propanesulfanoic acid group and its sodium salt, an N-[tris(hydroxymethyl)methyl] group, a 2-carboxyethyl group and/or a 3-sulfopropyl group.

A second subject of the invention is an agent for treating surfaces, in particular hard surfaces or textiles, characterized in that it contains at least one polymer according to the invention of the first subject of the invention and at least one surfactant.

The agent according to the invention can be in solid form, in particular as a gel body or as a granular mixture (such as, for example, granules or powder or a shaped body, for example a tablet), or it can be liquid. In the context of a preferred embodiment, the agent according to the invention is liquid.

A substance (e.g. a composition) is solid according to the definition of the invention if it is in the solid physical state at 20° C. and 1013 mbar.

A substance (e.g. a composition) is liquid according to the definition of the invention if it is in the liquid physical state at 20° C. and 1013 mbar.

A chemical compound is an organic compound if the molecule of the chemical compound contains at least one covalent bond between carbon and hydrogen. This definition applies mutatis mutandis to, inter alia, "organic bleach activators" as the chemical compound.

By implication from the definition of an organic compound, a chemical compound is an inorganic compound if the molecule of the chemical compound does not contain a covalent bond between carbon and hydrogen.

In addition to the polymer, the agent according to the invention contains at least one surfactant as an essential component. Suitable surfactants according to the invention are preferably anionic surfactants, non-ionic surfactants, zwitterionic surfactants, amphoteric surfactants or cationic surfactants.

The agent according to the invention preferably contains a total amount of 0.1 to 70 wt. % of surfactant relative to its total weight.

Particularly preferred agents according to the invention contain, relative to the total weight thereof, a total amount of from 0.1 to 5.0 wt. % of at least one surfactant. Agents of this kind are suitable for the use according to the invention, in particular in a dishwasher. It is in turn particularly preferable for the agent to contain at least one non-ionic surfactant.

Particularly preferred agents according to the invention contain a total amount of from 5 to 70 wt. %, more preferably from 20 to 65 wt. %, very particularly preferably from 25 to 60 wt. %, of at least one surfactant relative to the total weight thereof. Such agents are suitable for the use according to the invention; however, they are particularly suitable for use in a washing machine for textile washing. It is in turn particularly preferable for the agent to contain at least one anionic surfactant and optionally also at least one non-ionic surfactant.

A preferred agent according to the invention is characterized in that it contains at least one anionic surfactant. Surfactant compositions according to the invention comprising an anionic surfactant can be used in the fields of application mentioned above; however, they are preferably suitable for washing textiles, particularly preferably for use in a washing machine for textile washing.

If the agent according to the invention contains an anionic surfactant, it is in turn preferable for said anionic surfactant to be contained in a total amount of from 8 to 70 wt. %, in particular from 25 to 60 wt. %, more preferably from 30 to 40 wt. %, relative to the total weight of the composition.

Sulfonates and/or sulfates can preferably be used as the anionic surfactant.

Surfactants of the sulfonate type that can be used are preferably $C_{9-13}$-alkylbenzene sulfonates, olefin sulfonates, i.e. mixtures of alkene and hydroxyalkane sulfonates, and disulfonates, as obtained, for example, from $C_{12-18}$-monoolefins having a terminal or internal double bond by way of sulfonation with gaseous sulfur trioxide and subsequent alkaline or acid hydrolysis of the sulfonation products. $C_{12-18}$-alkane sulfonates and the esters of α-sulfofatty acids (ester sulfonates) are also suitable, for example the α-sulfonated methyl esters of hydrogenated coconut, palm kernel or tallow fatty acids.

Particularly preferred agents according to the invention contain, as the anionic surfactant, at least one compound of formula (T1),

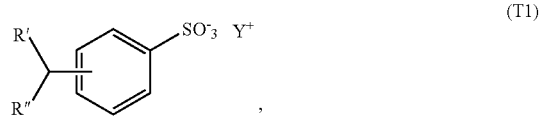

(T1)

in which
R' and R" are, independently of one another, H or alkyl, and together contain 9 to 19, preferably 9 to 15 and in particular 9 to 13, C atoms, and $Y^+$ denotes a monovalent cation or the nth part of an n-valent cation (in particular $Na^+$).

As alk(en)yl sulfates, the alkali salts and in particular the sodium salts of the sulfuric acid half-esters of $C_{12}$-$C_{18}$ fatty alcohols, for example from coconut fatty alcohol, tallow fatty alcohol, lauryl alcohol, myristyl alcohol, cetyl alcohol or stearyl alcohol, or of $C_{10}$-$C_{20}$-oxo alcohols and the semiesters of secondary alcohols having these chain lengths are preferred. From a washing perspective, $C_{12}$-$C_{16}$-alkyl sulfates, $C_{12}$-$C_{15}$-alkyl sulfates and $C_{14}$-$C_{15}$-alkyl sulfates are preferred. 2,3-alkyl sulfates are also suitable anionic surfactants.

Fatty alcohol ether sulfates, such as the sulfuric acid monoesters of straight-chain or branched $C_{7-21}$ alcohols ethoxylated with 1 to 6 mol ethylene oxide, such as 2-methyl-branched $C_{9-11}$ alcohols having, on average, 3.5 mol ethylene oxide (EO) or $C_{12-18}$ fatty alcohols having 1 to 4 EO, are also suitable.

Other suitable anionic surfactants are soaps. Saturated and unsaturated fatty acid soaps are suitable, such as the salts of lauric acid, myristic acid, palmitic acid, stearic acid, (hydrogenated) erucic acid and behenic acid, and in particular soap mixtures derived from natural fatty acids, such as coconut, palm kernel, olive oil or tallow fatty acids.

The anionic surfactants, and the soaps, can be present in the form of sodium, potassium, magnesium or ammonium salts thereof. The anionic surfactants are preferably present in the form of the ammonium salts thereof. Preferred counterions for the anionic surfactants are the protonated forms of choline, triethylamine, monoethanolamine, triethanolamine or methylethylamine.

In a very particularly preferred embodiment, the agent according to the invention contains an alkyl benzene sulfonic acid neutralized with monoethanolamine, in particular $C_{9-13}$-alkyl benzene sulfonic acid, and/or a fatty acid neutralized with monoethanolamine.

A preferred agent according to the invention contains at least one anionic surfactant selected from the group comprising $C_{8-18}$-alkylbenzene sulfonates, olefin sulfonates, $C_{12-18}$-alkane sulfonates, ester sulfonates, alkyl sulfates, alkenyl sulfates, fatty alcohol ether sulfates and mixtures thereof.

In a preferred embodiment, the agent according to the invention contains at least one non-ionic surfactant.

The at least one non-ionic surfactant can be any known non-ionic surfactant that is suitable for the purpose according to the invention.

In a preferred embodiment of the invention, the agents described herein according to the invention contain, as a non-ionic surfactant, at least one fatty alcohol alkoxylate having the following formula (T2), $$R'—O—(XO)_m—H \quad (T2)$$

where R' represents a linear or branched $C_8$-$C_{18}$-alkyl radical, an aryl radical or alkylaryl radical, XO is independently an ethylene oxide (EO) or propylene oxide (PO) group, and m is an integer from 1 to 50. In the above formula, R' represents a linear or branched, substituted or unsubstituted alkyl radical. In a preferred embodiment of the present invention, $R^I$ is a linear or branched alkyl radical having 5 to 30 carbon atoms, preferably 7 to 25 carbon atoms, and in particular 10 to 19 carbon atoms. Preferred radicals R' are selected from decyl, undecyl, dodecyl, tridecyl, tetradecyl, pentadecyl, hexadecyl, heptadecyl, octadecyl, nonadecyl radicals and mixtures thereof, where the representatives having an even number of carbon atoms are preferred. Particularly preferred radicals R' are derived from fatty alcohols having 12 to 19 carbon atoms, for example from coconut fatty alcohol, tallow fatty alcohol, lauryl, myristyl, cetyl or stearyl alcohol, or from oxo alcohols having 10 to 19 carbon atoms.

XO in formula (T2) is an ethylene oxide (EO) or propylene oxide (PO) group, preferably an ethylene oxide group.

The index m in formula (T2) is an integer from 1 to 50, preferably 2 to 20, and more preferably 2 to 10. In particular, m is 3, 4, 5, 6 or 7. The surfactant composition according to the invention may contain mixtures of non-ionic surfactants having different degrees of ethoxylation.

In summary, particularly preferred fatty alcohol alkoxylates are those of the formula (T3)

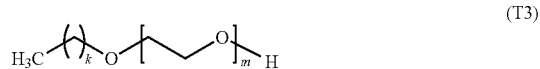
(T3)

where k=9 to 17, and m=3, 4, 5, 6, or 7. Very particularly preferred representatives are fatty alcohols having 10 to 18 carbon atoms and 7 EO (k=11 to 17, m=7).

Fatty alcohol ethoxylates of this kind are available under the trade names Dehydol® LT7 (BASF), Lutensol® AO7 (BASF), Lutensol® M7 (BASF), and Neodol® 45-7 (Shell Chemicals).

Particularly preferably, the agents according to the invention contain non-ionic surfactants from the group of alkoxylated alcohols. Preferably used as non-ionic surfactants are alkoxylated, advantageously ethoxylated, in particular primary alcohols having preferably 8 to 18 C atoms and on average 1 to 12 mol ethylene oxide (EO) per mol of alcohol in which the alcohol radical can be linear or preferably methyl-branched in the 2 position, or can contain linear and methyl-branched radicals in admixture, as are usually present in oxo alcohol radicals. However, alcohol ethoxylates having linear radicals of alcohols of native origin having 12 to 18 C atoms, for example from coconut, palm, tallow fatty or oleyl alcohol, and an average 2 to 8 EO per mol of alcohol, are particularly preferred. Preferred ethoxylated alcohols include, for example $C_{12-14}$-alcohols having 3 EO or 4 EO, $C_{8-11}$-alcohol having 7 EO, $C_{13-15}$-alcohols having 3 EO, 5 EO, 7 EO or 8 EO, $C_{12-18}$-alcohols having 3 EO, 5 EO or 7 EO and mixtures thereof, such as mixtures of $C_{12-14}$-alcohol with 3 EO and $C_{12-18}$-alcohol with 5 EO.

Preferred alcohol ethoxylates have a narrowed homolog distribution (narrow range ethoxylates, NRE). In addition to these non-ionic surfactants, fatty alcohols having more than 12 EO can also be used in particular as cleaning agents for automatic dishwashing. Examples of these are tallow fatty alcohols having 14 EO, 25 EO, 30 EO, or 40 EO.

Ethoxylated non-ionic surfactants are particularly preferably used which were obtained from $C_{6-20}$-monohydroxy alkanols or $C_{6-20}$-alkyl phenols or $C_{16-20}$-fatty alcohols and more than 12 mol, preferably more than 15 mol, and in particular more than 20 mol, of ethylene oxide per mol of alcohol. A particularly preferred non-ionic surfactant is obtained from a straight-chain fatty alcohol having 16 to 20 carbon atoms ($C_{16-20}$-alcohol), preferably a $C_{18}$-alcohol and at least 12 mol, preferably at least 15 mol and in particular at least 20 mol, of ethylene oxide. Of these, what are referred to as "narrow range ethoxylates" are particularly preferred.

Surfactants that are preferably used come from the groups of the alkoxylated non-ionic surfactants, in particular the ethoxylated primary alcohols and mixtures of these surfactants with structurally complex surfactants such as polyoxypropylene/polyoxyethylene/polyoxypropylene ((PO/EO/PO) surfactants). Such non-ionic (PO/EO/PO) surfactants are also characterized by good foam control.

In the context of the present invention, low-foaming non-ionic surfactants which have alternating ethylene oxide and alkylene oxide units have been found to be particularly preferred non-ionic surfactants, in particular for cleaning agents for automatic dishwashing. Of these, in turn, surfactants having EO-AO-EO-AO blocks are preferred, where one to ten EO groups or AO groups are bonded to one another before a block of the other group follows. In this case, non-ionic surfactants of general formula (T4)

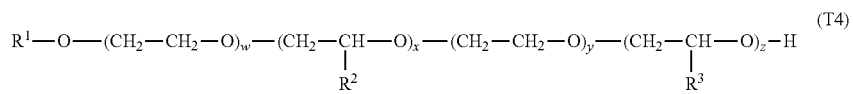
(T4)

are preferred in which $R^1$ represents a straight-chain or branched, saturated or mono- or polyunsaturated $C_{6-24}$-alkyl or -alkenyl radical; each $R^2$ or $R^3$ group is selected, independently of one another, from —$CH_3$,—$CH_2CH_3$,—$CH_2CH_2$—$CH_3$ and —$CH(CH_3)_2$, and the indices w, x, y, z, independently of one another, represent integers from 1 to 6.

Preferred non-ionic surfactants of the above formula can be produced, using known methods, from the corresponding alcohols $R^1$—OH and ethylene or alkylene oxide. The $R^1$ radical in the above formula can vary depending on the origin of the alcohol. If native sources are used, the radical $R^1$ has an even number of carbon atoms and is generally unbranched, the linear radicals comprising alcohols of native origin with 12 to 18 C atoms, for example coconut, palm, tallow fat or oleyl alcohol, being preferred. Some examples of alcohols that are available from synthetic sources are the Guerbet alcohols or radicals that are methyl-branched or linear and methyl-branched in the 2 position in admixture, such as those usually present in oxo-alcohol radicals. Independently of the type of alcohol used for the production of the non-ionic surfactants contained in agents according to the invention, non-ionic surfactants are preferred in which $R^1$ represents an alkyl radical having 6 to 24, preferably 8 to 20, particularly preferably 9 to 15, and in particular 9 to 11 carbon atoms in the above formula.

Besides propylene oxide, butylene oxide in particular is worthy of consideration as an alkylene oxide unit that is contained, alternately to the ethylene oxide unit, in the preferred non-ionic surfactants. However, other alkylene oxides in which $R^2$ and $R^3$ are selected, independently of one another, from —$CH_2CH_2$—$CH_3$ or —$CH(CH_3)_2$ are also suitable. Preferably, non-ionic surfactants of the above formula are used in which $R^2$ and $R^3$ represent a-$CH_3$ radical; w and x represent, independently of one another, values of 3 or 4; and y and z represent, independently of one another, values of 1 or 2.

Further preferably used non-ionic surfactants, in particular for cleaning agents for automatic dishwashing, are non-ionic surfactants of the general formula (T5)

$R^1O(AlkO)_xM(OAlk)_yOR^2$ (T5)

where $R^1$ and $R^2$ represent, independently of one another, a branched or unbranched, saturated or unsaturated, optionally hydroxylated alkyl radical having 4 to 22 carbon atoms; Alk represents a branched or unbranched alkyl radical having 2 to 4 carbon atoms; x and y represent, independently of one another, values of between 1 and 70; and M represents an alkyl radical from the group $CH_2$, $CHR^3$, $CR^3R^4$, $CH_2CHR^3$ and $CHR^3CHR^4$, where $R^3$ and $R^4$ represent, independently of one another, a branched or unbranched, saturated or unsaturated alkyl radical having 1 to 18 carbon atoms.

Preferred in this case are non-ionic surfactants of the general formula (T6)

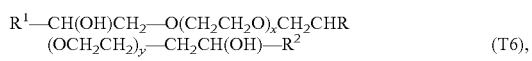

$R^1$—CH(OH)CH_2—O(CH_2CH_2O)_xCH_2CHR$
$(OCH_2CH_2)_y$—$CH_2CH(OH)$—$R^2$ (T6), where R, $R^1$ and $R^2$, independently of one another, represent an alkyl radical or alkenyl radical having 6 to 22 carbon atoms; x and y, independently of one another, represent values of between 1 and 40.

Preferred in this case are, in particular, compounds of the general formula (T7)

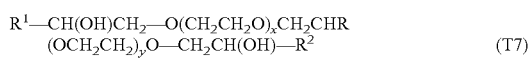

$R^1$—CH(OH)CH_2—O(CH_2CH_2O)_xCH_2CHR$
$(OCH_2CH_2)_y$O—$CH_2CH(OH)$—$R^2$ (T7)

in which R represents a linear, saturated alkyl radical having 8 to 16 carbon atoms, preferably 10 to 14 carbon atoms, and $R^1$ and $R^2$ represent, independently of one another, an alkyl radical or alkenyl radical having 6 to 22 carbon atoms, and n and m represent, independently of one another, values of from 20 to 30. Such compounds can be obtained, for example, by reacting alkyl diols HO—CHR—CH_2—OH with ethylene oxide, a reaction with an alkyl epoxide being performed subsequently in order to close the free OH functions during formation of a dihydroxy ether.

Preferred non-ionic surfactants are in this case, in particular for cleaning agents for automatic dishwashing, those of general formula (T8)

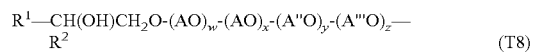

$R^1$—CH(OH)CH_2O-(AO)_w-(AO)_x-(A''O)_y-(A'''O)_z$—
$R^2$ (T8)

in which
 $R^1$ represents a straight-chain or branched, saturated or mono- or polyunsaturated $C_{6-24}$-alkyl or alkenyl radical;
 $R^2$ represents hydrogen or a linear or branched hydrocarbon radical having 2 to 26 carbon atoms;
 A, A', A'' and A''' represent, independently of one another, a radical from the group —$CH_2CH_2$, —$CH_2CH_2$—$CH_2$, —$CH_2$—$CH(CH_3)$, —$CH_2$—$CH_2$—$CH_2$—$CH_2$, —$CH_2$—$CH(CH_3)$—$CH_2$—, —$CH_2$—$CH(CH_2$—$CH_3)$,
 w, x, y and z represent values of between 0.5 and 120, where x, y and/or z can also be 0.

By adding the aforementioned non-ionic surfactants of general formula (T8)

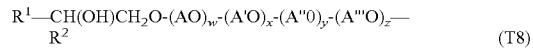

$R^1$—CH(OH)CH_2O-(AO)_w-(A'O)_x-(A''0)_y-(A'''O)_z$—
$R^2$ (T8)

hereinafter also referred to as "hydroxy mixed ethers," the cleaning performance of preparations according to the invention can surprisingly be significantly improved, specifically in comparison to systems that contain alternative non-ionic surfactants, such as those from the group of polyalkoxylated fatty alcohols.

By using these non-ionic surfactants having one or more free hydroxyl groups on one or both terminal alkyl radicals, the stability of the enzymes that may be additionally contained in the agents according to the invention can be significantly improved.

In particular for cleaning agents for automatic dishwashing, those end-group-capped poly(oxyalkylated) non-ionic surfactants are preferred which, according to the following formula (T10)

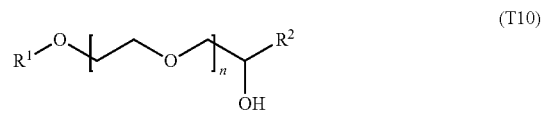

in addition to a radical $R^1$, which represents linear or branched, saturated or unsaturated, aliphatic or aromatic hydrocarbon radicals having 2 to 30 carbon atoms, preferably having 4 to 22 carbon atoms, also have a linear or branched, saturated or unsaturated, aliphatic or aromatic hydrocarbon radical $R^2$ having 1 to 30 carbon atoms, where n represents values of between 1 and 90, preferably values of between 10 and 80, and in particular values of between 20 and 60. Surfactants of the above formula are particularly preferred in which $R^1$ represents $C_7$ to $C_{13}$, n represents a whole natural number from 16 to 28 and $R^2$ represents $C_8$ to $C_{12}$.

Surfactants of formula $R^1O[CH_2CH(CH_3)O]_x[CH_2CH_2O]_yCH_2CH(OH)R^2$ are particularly preferred, in particular for cleaning agents for automatic dishwashing, in which $R^1$ represents a linear or branched aliphatic hydrocarbon radical having 4 to 18 carbon atoms or mixtures thereof, $R^2$ represents a linear or branched hydrocarbon radical having 2 to 26 carbon atoms or mixtures thereof, x represents values of between 0.5 and 1.5, and y represents a value of at least 15. The group of these non-ionic surfactants includes, for example, the $C_{2-26}$ fatty alcohol-$(PO)_1$-$(EO)_{15-40}$-2-hydroxyalkyl ethers, in particular also the $C_{8-10}$ fatty alcohol-$(PO)_1$-$(EO)_{22}$-2-hydroxydecyl ethers.

Preferred in particular are those end-group-capped poly(oxyalkylated) non-ionic surfactants, in particular for cleaning agents for automatic dishwashing, which are of the formula

in which $R^1$ and $R^2$ represent, independently of one another, a linear or branched, saturated or mono- or polyunsaturated hydrocarbon radical having 2 to 26 carbon atoms, $R^3$ is selected, independently of one another, from —$CH_3$, —$CH_2CH_3$, —$CH_2CH_2$—$CH 3$, —$CH(CH_3)_2$, but preferably represents —$CH_3$, and x and y represent, independently of one another, values of between 1 and 32, where non-ionic surfactants with $R^3$=—$CH_3$ and values for x of 15 to 32 and for y of 0.5 and 1.5 being very particularly preferred.

Further preferably used non-ionic surfactants, in particular for cleaning agents for automatic dishwashing, are the end-group-capped poly(oxyalkylated) non-ionic surfactants of the formula

in which $R^1$ and $R^2$ represent linear or branched, saturated or unsaturated, aliphatic or aromatic hydrocarbon radicals having 1 to 30 carbon atoms, $R^3$ represents H or a methyl, ethyl, n-propyl, iso-propyl, n-butyl, 2-butyl or 2-methyl-2-butyl radical, x represents values between 1 and 30, and k and j represent values between 1 and 12, preferably between 1 and 5. If the value is x>2, each $R^3$ in the above formula $R^1O[CH_2CH(R^3)O]_x[CH_2]_kCH(OH)[CH_2]_jOR^2$ can be different. $R^1$ and $R^2$ are preferably linear or branched, saturated or unsaturated, aliphatic or aromatic hydrocarbon radicals having 6 to 22 carbon atoms, radicals having 8 to 18 C atoms being particularly preferred. For the radical $R^3$, H, —$CH_3$ or —$CH_2CH_3$ are particularly preferred. Particularly preferred values for x are in the range from 1 to 20, in particular from 6 to 15.

As described above, each $R^3$ in the above formula can be different if x>2. In this way, the alkylene oxide unit in square brackets can be varied. For example, if x represents 3, the radical $R^3$ can be selected in order to form ethylene oxide ($R^3$=H) or propylene oxide ($R^3$=$CH_3$) units, which can be joined together in any sequence, for example (EO)(PO)(EO), (EO)(EO)(PO), (EO)(EO)(EO), (PO)(EO)(PO), (PO)(PO)(EO) and (PO)(PO)(PO). The value 3 has been selected here for x by way of example and can by all means be greater, in which case the range of variation increases as the values for x increase and includes a large number of (EO) groups combined with a small number of (PO) groups, for example, or vice versa.

Particularly preferred end-group-capped poly(oxyalkylated) alcohols of the above formula have values of k=1 and j=1, and therefore the previous formula is simplified to $R^1O[CH_2CH(R^3)O]_xCH_2CH(OH)CH_2OR^2$. In the last-mentioned formula, $R^1$, $R^2$ and $R^3$ are as defined above and x represents numbers from 1 to 30, preferably from 1 to 20, and in particular from 6 to 18. Surfactants in which the radicals $R^1$ and $R^2$ have 9 to 14 C atoms, $R^3$ represents H, and x assumes values from 6 to 15 are particularly preferred. Finally, the non-ionic surfactants of general formula $R^1$—$CH(OH)CH_2O$-$(AO)_w$—$R^2$ have proven to be particularly effective, in which $R^1$ represents a straight-chain or branched, saturated or mono- or polyunsaturated $C_{6-24}$-alkyl or alkenyl radical;

$R^2$ represents a linear or branched hydrocarbon radical having 2 to 26 carbon atoms;

A represents a radical from the group $CH_2CH_2$, $CH_2CH_2CH_2$, $CH_2CH(CH_3)$, preferably $CH_2CH_2$, and w represents values between 1 and 120, preferably 10 to 80, particularly 20 to 40.

The group of these non-ionic surfactants includes, for example, the $C_{4-22}$ fatty alcohol-$(EO)_{10-80}$-2-hydroxyalkyl ethers, in particular including the $C_{8-12}$ fatty alcohol-$(EO)_{22}$-2-hydroxydecyl ethers and the $C_{4-22}$ fatty alcohol-$(EO)_{40-80}$-2-hydroxyalkyl ethers.

Furthermore, the agent according to the invention can contain amine oxide as the non-ionic surfactant. In principle, all the amine oxides found in the prior art for this purpose, i.e. compounds that have the formula $R^1R^2R^3NO$, where each of $R^1, R^2$ and $R^3$ are, independently of one another, a hydrocarbon chain, substituted where applicable and having 1 to 30 carbon atoms, can be used as the amine oxide. Amine oxides that are particularly preferably used are those in which $R^1$ is an alkyl having 12 to 18 carbon atoms and $R^2$ and $R^3$ are, independently of one another, an alkyl having 1 to 4 carbon atoms, in particular alkyl dimethyl amine oxides having 12 to 18 carbon atoms. Examples of representatives of suitable amine oxides are N-coconut-alkyl-N,N-dimethyl amine oxide, N-tallow alkyl-N,N-dihydroxyethyl amine oxide, myristyl-/cetyl dimethyl amine oxide or lauryl dimethyl amine oxide.

Suitable non-ionic surfactants include alkyl glycosides of general formula $RO(G)_x$, for example, in which R corresponds to a primary straight-chain or methyl-branched aliphatic radical, in particular an aliphatic radical that is methyl-branched in the 2 position, having 8 to 22, preferably 12 to 18, C atoms, and G is the symbol that represents a glycose unit having 5 or 6 C atoms, preferably glucose. The degree of oligomerization x, which indicates the distribution of monoglycosides and oligoglycosides, is any number between 1 and 10; x is preferably between 1.2 and 1.4.

Another class of preferably used non-ionic surfactants, which are used either as the sole non-ionic surfactant or in combination with other non-ionic surfactants, are alkoxylated, preferably ethoxylated or ethoxylated and propoxylated fatty acid alkyl esters, preferably having 1 to 4 carbon atoms in the alkyl chain.

Other suitable surfactants are the polyhydroxy fatty acid amides, which are known as PHFAs.

Other non-ionic surfactants that can be used may be, for example, polyol fatty acid esters, alkoxylated triglycerides, alkoxylated fatty acid alkyl esters of formula $R^3CO$—$(OCH_2CHR^4)wOR^5$, in which $R^3CO$ represents a linear or branched, saturated and/or unsaturated acyl radical having 6 to 22 carbon atoms, $R^4$ represents hydrogen or methyl, and $R^5$ represents linear or branched alkyl radicals having 1 to 4 carbon atoms, and w is 1 to 20, hydroxy mixed ethers, sorbitan fatty acid esters and addition products of ethylene oxide to sorbitan fatty acid esters such as the polysorbates, sugar fatty acid esters and addition products of ethylene oxide to sugar fatty acid esters, addition products of ethylene oxide to fatty acid alkanolamides and fatty amines, or fatty acid-N-alkyl glucamides.

The surfactant compositions according to the invention described herein may also contain a plurality of the non-ionic surfactants described above.

Agents which are particularly preferred according to the invention, in particular liquid agents, each contain a total amount, relative to the total weight of the agent, of from 30 to 40 wt. % of at least one anionic surfactant and from 18 to 28 wt. % of at least one non-ionic surfactant.

Very particularly preferred agents according to the invention, in particular liquid agents, contain at least one surfactant combination as described below for the compositions (A) to (D):

(A) Agent for the treatment of surfaces, in particular textiles, characterized in that it contains at least one polymer according to the invention of the first subject matter of the invention and as a surfactant in each case relative to the total weight of the composition at least a total respective amount of 25 to 60 wt. % of at least one anionic surfactant, at least one $C_{9-13}$-alkyl benzene sulfonate being contained as an anionic surfactant, and 2 to 35 wt. % of at least one non-ionic surfactant, at least one alkoxylated alcohol having 8 to 18 carbon atoms and on average 4 to 12 mol ethylene oxide (EO) per mol of alcohol being contained as non-ionic surfactant.

(B) Agent for the treatment of surfaces, in particular textiles, characterized in that it contains at least one polymer according to the invention of the first subject matter of the invention and as a surfactant in each case relative to the total weight of the composition at least a total respective amount of 25 to 60 wt. % of at least one anionic surfactant, at least 25 to 60 wt. % of at least one $C_{9-13}$-alkyl benzene sulfonate being contained as anionic surfactant, and 2 to 35 wt. % of at least one non-ionic surfactant, at least 2 to 35 wt. % of at least one alkoxylated alcohol having 8 to 18 carbon atoms and on average 4 to 12 mol ethylene oxide (EO) per mol of alcohol being contained as a non-ionic surfactant.

(C) Agent for the treatment of surfaces, in particular textiles, characterized in that it contains at least one polymer according to the invention of the first subject matter of the invention and as a surfactant in each case relative to the total weight of the composition at least a total respective amount of from 30 to 40 wt. % of at least one anionic surfactant, at least one $C_{9-13}$-alkyl benzene sulfonate being contained as an anionic surfactant, and 18 to 28 wt. % of at least one non-ionic surfactant, at least one alkoxylated alcohol having 8 to 18 carbon atoms and on average 4 to 12 mol ethylene oxide (EO) per mol of alcohol being contained as a non-ionic surfactant.

(D) Agent for the treatment of surfaces, in particular textiles, characterized in that it contains at least one polymer according to the invention of the first subject matter of the invention and as a surfactant in each case relative to the total weight of the composition at least a total respective amount of 30 to 40 wt. % of at least one anionic surfactant, at least 30 to 40 wt. % of at least one $C_{9-13}$-alkyl benzene sulfonate being contained as an anionic surfactant, and 18 to 28 wt. % of at least one non-ionic surfactant, at least 18 to 28 wt. % of at least one alkoxylated alcohol having 8 to 18 carbon atoms and on average 4 to 12 mol ethylene oxide (EO) per mol of alcohol being contained as a non-ionic surfactant.

The agent according to the invention preferably additionally contains water. It is in turn preferable for water to be contained in the agent according to the invention, relative to the total weight of the composition, preferably in a total amount of between 0 and 70 wt. %, in particular between 0 and 60 wt. %, more preferably between 0 and 40 wt. %, particularly preferably between 0 and 25 wt. %. The proportion of water in the agent according to the invention is very particularly preferably 20 wt. % or less, more preferably 15 wt. % or less, even more preferably 12 wt. % or less, in particular between 20 and 4 wt. %. The amounts in wt. % are in relation to the total weight of the agent.

If the agents according to the invention contain water in less than 35 wt. %, in particular less than 30% by weight, preferably less than 25 wt. %, particularly preferably less than 20 wt. %, it is preferred to provide the agents in the form of a portion, the portion comprising at least one chamber with walls made of water-soluble material in which the agent according to the invention is present.

A portion is an independent dosing unit having at least one chamber. Adding together all the chambers, the compositions produced overall therein produce the product to be dosed of the portion. A chamber is a space delimited by walls (e.g. by a film), which space can also exist without the product to be dosed (in some cases with its shape being changed). A layer of a surface coating is not explicitly covered by the definition of a wall.

The water-soluble material forms walls of the chamber and thereby encases the agent according to the invention.

According to the invention, the wall is made of a water-soluble material. The water solubility of the material can be determined by means of a square film of said material (film: 22×22 mm with a thickness of 76 μm) fixed in a square frame (edge length on the inside: 20 mm) according to the following measurement protocol. Said framed film is submerged into 800 ml of distilled water, temperature-controlled to 20° C., in a 1 liter beaker with a circular base (Schott, Mainz, beaker glass 1000 ml, low shape), so that the surface of the tensioned film is arranged at a right angle to the base of the beaker glass, the upper edge of the frame is 1 cm below the water surface, and the lower edge of the frame is oriented in parallel to the base of the beaker glass such that the lower edge of the frame extends along the radius of the base of the beaker glass and the center of the lower edge of the frame is arranged above the center of the radius of the beaker glass bottom. The material should dissolve within 600 seconds when stirred (stirring speed of magnet stirrer 300 rpm, stirring rod: 6.8 cm long, diameter 10 mm), such that no solid film particles at all can be seen with the naked eye. The walls are preferably made of a water-soluble film. According to the invention this film may preferably have a thickness of at most 150 μm (particularly preferably of at most 120 μm). Preferred walls are thus produced from a water-soluble film and have a thickness of at most 150 μm (particularly preferably of at most 120 μm, more particularly preferably of at most 90 μm).

Water-soluble portions of this kind can be produced either by means of methods of vertical form fill sealing (VFFS) or thermoforming methods. Particularly preferably, walls of at least one chamber are produced by sealing at least one film made of water-soluble material, in particular by sealing within the context of a form fill sealing process.

The thermoforming method generally includes forming a first layer from a water-soluble film material in order to produce at least one bulge for receiving at least one composition in each case, pouring the composition into the relevant bulge, covering the bulges filled with the composition with a second layer made of a water-soluble film material, and sealing the first and second layers to one another at least around the bulge.

The water-soluble material preferably contains at least one water-soluble polymer. The water-soluble material also preferably contains a water-soluble film material selected from polymers or polymer mixtures. The wrapping may be made up of one or of two or more layers of the water-soluble film material. The water-soluble film material of the first layer and of the additional layers, if present, may be the same or different.

It is preferable for the water-soluble material to contain polyvinyl alcohol or a polyvinyl alcohol copolymer.

Suitable water-soluble films as the water-soluble material are preferably relative to a polyvinyl alcohol or a polyvinyl alcohol copolymer of which the molecular weight is in each case in the range of from 10,000 to 1,000,000 gmol$^{-1}$, preferably 20,000 to 500,000 gmol$^{-1}$, particularly preferably 30,000 to 100,000 gmol$^{-1}$ and in particular 40,000 to 80,000 gmol$^{-1}$.

Polyvinyl alcohol is usually produced using hydrolysis of polyvinyl acetate, since the direct synthesis route is not possible. The same applies to polyvinyl alcohol copolymers, which are prepared accordingly from polyvinyl acetate copolymers. It is preferable for at least one layer of the water-soluble material to include a polyvinyl alcohol of which the degree of hydrolysis is from 70 to 100 mol %, preferably from 80 to 90 mol. %, particularly preferably from 81 to 89 mol %, and in particular from 82 to 88 mol %.

Polymers selected from the group comprising acrylic acid-containing polymers, polyacrylamides, oxazoline polymers, polystyrene sulfonates, polyurethanes, polyesters, polyethers, polylactic acid, and/or mixtures of the above polymers may additionally be added to the film material suitable as the water-soluble material.

Preferred polyvinyl alcohol copolymers include, in addition to vinyl alcohol, dicarboxylic acids as further monomers. Suitable dicarboxylic acids are itaconic acid, malonic acid, succinic acid and mixtures thereof, with itaconic acid being preferred.

Polyvinyl alcohol copolymers which include, in addition to vinyl alcohol, an ethylenically unsaturated carboxylic acid, or the salt or ester thereof, are also preferred. Polyvinyl alcohol copolymers of this kind particularly preferably contain, in addition to vinyl alcohol, acrylic acid, methacrylic acid, acrylic acid ester, methacrylic acid ester or mixtures thereof.

The film material used as water-soluble material has a preferred thickness in a range of from 65 to 180 μm, in particular from 70 to 150 μm, more preferably from 75 to 120 μm.

A bittering agent is preferably incorporated into the aforementioned water-soluble material of the walls of the portion, in order to increase product safety. Corresponding embodiments of the water-soluble material having a bittering agent are described in publications EP-B1-2 885 220 and EP-B1-2 885 221. A preferred bittering agent is denatonium benzoate.

Suitable water-soluble films for use as the water-soluble material of the wall of the water-soluble portion according to the invention are films which are sold by MonoSol LLC under the designation M8630. Other suitable films include films having the designation Solublon® PT, Solublon® KA, Solublon® KC or Solublon® KL from Aicello Chemical Europe GmbH, or the VF-HP films from Kuraray, or HiSelon SH2312 from Nippon Gohesi.

It is very particularly preferred if the agents according to the invention (in particular in addition to water) additionally contain at least one organic solvent.

The solubility of the aforementioned agent, and the stability thereof, is improved if preferably the second agent according to the invention additionally contains at least one organic solvent having at least one hydroxyl group, without amino group and having a molecular weight of at most 500 g/mol.

This aforementioned organic solvent is in turn preferably selected from ($C_2$-$C_8$)-alkanols having at least one hydroxyl group (particularly preferably selected from the group ethanol, ethylene glycol, 1,2-propanediol, glycerol, 1,3-propanediol, n-propanol, isopropanol, 1,1,1-trimethylolpropane, 2-methyl-1,3-propanediol, 2-hydroxymethyl-1,3-propanediol, or mixtures thereof), triethylene glycol, butyl diglycol, polyethylene glycols having a weight-average molar mass $M_w$ of at most 500 g/mol, glycerol carbonate, propylene carbonate, 1-methoxy-2-propanol, 3-methoxy-3-methyl-1-butanol, butyl lactate, 2-isobutyl-2-methyl-4-hydroxymethyl-1,3-dioxolane, 2,2-dimethyl-4-hydroxymethyl-1,3-dioxolane, dipropylene glycol, or mixtures thereof.

It is in turn particularly preferable for said organic solvent to be contained in a total amount of from 5 to 40 wt. %, in particular from 10 to 35 wt. %.

The agents according to the invention can additionally contain at least one enzyme. In principle, all enzymes established in the prior art for cleaning substrate surfaces, in particular for textile treatment and cleaning hard surfaces, can be used in this regard. This at least one enzyme is preferably one or more enzymes which can develop catalytic activity in a surfactant-containing liquor, in particular a protease, amylase, lipase, cellulase, hemicellulase, mannanase, pectin-cleaving enzyme, tannase, xylanase, xanthanase, ß-glucosidase, carrageenanase, perhydrolase, oxidase, oxidoreductase and mixtures thereof. Preferred suitable hydrolytic enzymes include in particular proteases, amylases, in particular α-amylases, cellulases, lipases, hemicellulases, in particular pectinases, mannanases, ß-glucanases, and mixtures thereof. Proteases, amylases and/or lipases and mixtures thereof are particularly preferred, and proteases are very particularly preferred. These enzymes are in principle of natural origin; starting from the natural molecules, variants that have been improved for use in washing or cleaning agents are available, which are preferably used accordingly.

Among the proteases, the subtilisin-type proteases are preferred. Examples of these are the subtilisins BPN' and Carlsberg, the protease PB92, the subtilisins 147 and 309, the alkaline protease from *Bacillus lentus*, the subtilisin DY, and the enzymes thermitase, proteinase K and proteases TW3 and TW7, which belong to the subtilases but no longer to the subtilisins in the narrower sense. Subtilisin Carlsberg is available in a developed form under the trade name Alcalase® from Novozymes A/S, Bagsvaerd, Denmark. Subtilisins 147 and 309 are marketed by Novozymes under the trade names Esperase® and Savinase®, respectively. The protease variants marketed under the name BLAP® are derived from the protease from *Bacillus lentus* DSM 5483. Other proteases that can be used are, for example, the enzymes available under the trade names Durazym®, Relase®, Everlase®, Nafizym®, Natalase®, Kannase® and Ovozyme® from Novozymes, the enzymes available under the trade names Puraſect®, Puraſect® OxP, Puraſect® Prime, Excellase® and Properase® from Genencor, the enzyme available under the trade name Protosol® from Advanced Biochemicals Ltd., Thane, India, the enzyme available under the trade name Wuxi® from Wuxi Snyder Bioproducts Ltd., China, the enzymes available under the trade names Proleather® and Protease P® from Amano Pharmaceuticals Ltd., Nagoya, Japan, and the enzyme available under the name Proteinase K-16 from Kao Corp., Tokyo, Japan. Also, the proteases from *Bacillus gibsonii* and *Bacillus pumilus* are particularly preferably used.

Examples of amylases that can be used according to the invention are α-amylases from *Bacillus licheniformis*, from *B. amyloliquefaciens* or from *B. stearothermophilus*, as well as the developments thereof that have been improved for use in washing or cleaning agents. The enzyme from *B. licheniformis* is available from Novozymes under the name Termamyl® and from Genencor under the name Purastar®ST. Development products of this α-amylase are available from Novozymes under the trade names Duramyl® and Termamyl®ultra, from Genencor under the name Purastar®OxAm, and from Daiwa Seiko Inc., Tokyo, Japan, as Keistase®. The □-amylase from *B. amyloliquefaciens* is marketed by Novozymes under the name BAN®, and derived variants from the α-amylase from *B. stearothermophilus* are marketed under the names BSG® and Novamyl®, also by Novozymes. Furthermore, for this purpose the α-amylases from *Bacillus* sp. A 7-7 (DSM 12368) and cyclodextrin glucanotransferase (CGTase) from *B. agaradherens* (DSM 9948) are to be emphasized. Fusion products of all mentioned molecules can also be used. Furthermore, the developments of the α-amylase from *Aspergillus niger* and *A. oryzae*, available under the trade name Fungamyl® from Novozymes, are suitable. Other commercial products that can advantageously be used are, for example, Amylase-LT®, and Stainzyme® or Stainzyme ultra® or Stainzyme plus® or Amplify Prime®, the latter also from Novozymes. Variants of these enzymes obtained by point mutations may also be used according to the invention.

Examples of lipases or cutinases that can be used according to the invention, which are contained in particular due to their triglyceride-cleaving activities, but also in order to produce peracids in situ from suitable precursors, are the lipases that can be originally obtained or developed from *Humicola lanuginosa* (*Thermomyces lanuginosis*), in particular those with the amino acid exchange D96L. These are marketed for example by Novozymes under the trade names Lipolase®, Lipolase®Ultra, LipoPrime®, Lipozyme® and Lipex®. Furthermore, the cutinases that have been isolated originally from *Fusarium solani pisi* and *Humicola insolens* can be used, for example. Lipases that can also be used are available from Amano under the names Lipase CE®, Lipase P®, Lipase B®, and Lipase CES®, Lipase AKG®, *Bacillus* sp. Lipase®, Lipase AP®, Lipase M-AP® and Lipase AML®. From Genencor, the lipases or cutinases of which the starting enzymes have been isolated originally from *Pseudomonas mendocina* and *Fusarium solanii* can be used, for example. The preparations M1 Lipase® and Lipomax® originally marketed by Gist-Brocades, the enzymes marketed by Meito Sangyo K K, Japan, under the names Lipase MY-30®, Lipase OF® and Lipase PL®, and the product Lumafast® from Genencor should be mentioned as other important commercial products.

Depending on their purpose, cellulases can be present as pure enzymes, as enzyme preparations or in the form of mixtures in which the individual components are advantageously complementary in terms of their different performance aspects, in particular in agents for textile washing. These performance aspects include in particular contributions of the cellulase to the primary washing performance of the agent (cleaning performance), to the secondary washing performance of the agent (anti-redeposition or graying inhibitors), to the brightening (effect on fabric) or to producing a "stone-washed" effect. A usable fungal cellulase preparation that is rich in endoglucanase (EG), or the developments thereof, are offered by Novozymes under the trade name Celluzyme®. The products Endolase® and Carezyme®, also available from Novozymes, are based on 50 kD-EG and 43 kD-EG, respectively, from *H. insolens* DSM 1800. Other commercial products from this company that can be used are Cellusoft®, Renozyme® and Celluclean®. It is also possible to use, for example, 20 kD-EG from *Melanocarpus*, which are available from AB Enzymes, Finland under the trade names Ecostone® and Biotouch®. Further trade products from AB Enzymes are Econase® and Ecopulp®. Other suitable cellulases are from *Bacillus* sp. CBS 670.93 and CBS 669.93, where it is available from *Bacillus* sp. CBS 670.93 is available from Genencor under the trade name Puradax®. Other commercial products from Genencor are "Genencor detergent cellulase L" and IndiAge®Neutra. Variants of these enzymes obtained by point mutations may also be used according to the invention. Particularly preferred cellulases are *Thielavia terrestris* cellulase variants, cellulases from *Melanocarpus*, in particular *Melanocarpus albomyces*, EGIII-type cellulases from *Trichoderma reesei*, or variants that can be obtained therefrom.

Furthermore, other enzymes which can be grouped together under the term "hemicellulases" can be used in particular to remove specific problematic stains on the substrate. These include, for example, mannanases, xanthan lyases, xanthanases, xyloglucanases, xylanases, pullulanases, pectin-cleaving enzymes, and β-glucanases. The β-glucanase obtained from *Bacillus subtilis* is available from Novozymes under the name Cereflo®. Hemicellulases that are particularly preferred according to the invention are mannanases which are marketed, for example, under the trade names Mannaway® by Novozymes or Purabrite® by Genencor. In the context of the present invention, the pectin-cleaving enzymes also include enzymes having the names pectinase, pectate lyase, pectin esterase, pectin demethoxylase, pectin methoxylase, pectin methylesterase, pectase, pectin methylesterase, pectinesterase, pectin pectyl hydrolase, pectin depolymerase, endopolygalacturonase, pectolase, pectin hydrolase, pectin polygalacturonase, endopolygalacturonase, poly-α-1,4-galacturonide, glycanohydrolase, endogalacturonase, endo-D-galacturonase, galacturan 1,4-α-galacturonidase, exopolygalacturonase, poly (galacturonate) hydrolase, exo-D-galacturonase, exo-D-galacturonanase, exopoly-D-galacturonase, exo-poly-α-galacturonosidase, exopolygalacturonosidase, or exopolygalacturanosidase. Examples of enzymes that are suitable in this regard are available for example under the names Gamanase®, Pektinex AR®, X-Pect® or Pectaway® from Novozymes, under the names Rohapect UF®, Rohapect TPL®, Rohapect PTE100®, Rohapect MPE®, Rohapect MA plus HC, Rohapect DA12L®, Rohapect 10L®, Rohapect B1L® from AB Enzymes, and under the name Pyrolase® from Diversa Corp., San Diego, CA, USA.

Of all these enzymes, particularly preferred are those which have been stabilized in a comparatively stable manner against oxidation or by means of point mutagenesis, for example. This includes in particular the aforementioned commercial products Everlase® and Purafect®OxP as examples of proteases of this kind and Duramyl® as an example of an α-amylase of this kind.

The agent according to the invention contains enzymes preferably in total amounts of from $1\times10^{-8}$ to 5 wt. % relative to active protein. Preferably, the enzymes are contained in this portion in a total amount of from 0.001 to 2 wt. %, more preferably from 0.01 to 1.5 wt. %, even more preferably from 0.05 to 1.25 wt. %, and particularly preferably from 0.01 to 0.5 wt. %.

Moreover, builders, complexing agents, optical brighteners (preferably in portions for textile washing), pH adjustments, perfume, dye, dye transfer inhibitors, or mixtures thereof can be contained in the agents according to the invention as additional ingredients.

The use of builder substances (builders) such as silicates, aluminum silicates (particularly zeolites), salts of organic di- and polycarboxylic acids, as well as mixtures of these substances, preferably water-soluble builder substances, can be advantageous.

In an embodiment that is preferred according to the invention, the use of phosphates (including polyphosphates) is largely or completely omitted. In this embodiment, the surfactant composition according to the invention preferably contains less than 5 wt. %, particularly preferably less than 3 wt. %, in particular less than 1 wt. %, phosphate(s). Particularly preferably, the surfactant composition according to the invention in this embodiment is completely phosphate-free, i.e. the compositions contain less than 0.1 wt. % phosphate(s).

The builders include in particular carbonates, citrates, phosphonates, organic builders, and silicates. The proportion by weight of the total builders with respect to the total weight of the composition according to the invention is preferably from 15 to 80 wt. % and in particular 20 to 70 wt. %.

Some examples of organic builders that are suitable according to the invention are the polycarboxylic acids (polycarboxylates) that can be used in the form of their sodium salts, polycarboxylic acids being understood as those carboxylic acids that carry more than one, in particular two to eight, acid functions, preferably two to six, in particular two, three, four, or five acid functions in the entire molecule. As polycarboxylic acids, dicarboxylic acids, tricarboxylic acids, tetracarboxylic acids, and pentacarboxylic acids, in particular di-, tri-, and tetracarboxylic acids, are thus preferred. The polycarboxylic acids can also carry additional functional groups such as hydroxyl or amino groups, for example. For example, these include citric acid, adipic acid, succinic acid, glutaric acid, malic acid, tartaric acid, maleic acid, fumaric acid, saccharic acids (preferably aldaric acids, for example galactaric acid and glucaric acid), aminocarboxylic acids, in particular aminodicarboxylic acids, aminotricarboxylic acids, aminotetracarboxylic acids such as nitrilotriacetic acid (NTA), glutamic-N,N-diacetic acid (also called N,N-bis(carboxymethyl)-L-glutamic acid or GLDA), methyl glycine diacetic acid (MGDA) and derivatives thereof and mixtures thereof. Preferred salts are the salts of the polycarboxylic acids such as citric acid, adipic acid, succinic acid, glutaric acid, tartaric acid, GLDA, MGDA, and mixtures thereof.

Other substances that are suitable as organic builders are polymeric polycarboxylates (organic polymers with a plurality of (in particular greater than ten) carboxylate functions in the macromolecule), polyaspartates, polyacetals, and dextrins.

Besides their building effect, the free acids also typically have the property of an acidification component. Particularly noteworthy here are citric acid, succinic acid, glutaric acid, adipic acid, gluconic acid, and any mixtures thereof.

Particularly preferred surfactant compositions according to the invention, in particular dishwashing detergents, preferably automatic dishwasher detergents, contain one or more salts of citric acid, i.e. citrates, as one of their important builders. These are preferably contained in a proportion of from 2 to 40 wt. %, in particular from 5 to 30 wt. %, more particularly from 7 to 28 wt. %, particularly preferably from 10 to 25 wt. %, very particularly preferably from 15 to 20 wt. %, in each case relative to the total weight of the composition.

It is also particularly preferred to use carbonate(s) and/or hydrogen carbonate(s), preferably alkali carbonate(s), particularly preferably sodium carbonate (soda), in amounts of from 2 to 50 wt. %, preferably from 4 to 40 wt. %, and in particular from 10 to 30 wt. %, very particularly preferably 10 to 24 wt. %, in each case relative to the weight of the composition.

Particularly preferred surfactant compositions according to the invention, in particular dishwashing detergents, preferably automatic dishwasher detergents, are characterized in that they contain at least two builders from the group of silicates, phosphonates, carbonates, aminocarboxylic acids, and citrates, with the proportion by weight of these builders, relative to the total weight of the surfactant composition according to the invention, being preferably from 5 to 70 wt. %, more preferably 15 to 60 wt. %, and in particular 20 to 50 wt. %. The combination of two or more builders from the aforementioned group has proven advantageous for the cleaning and rinsing performance of washing or cleaning agents according to the invention, in particular dishwashing detergents, preferably automatic dishwasher detergents. Beyond the builders mentioned here, one or more additional builders can also be contained.

Preferred surfactant compositions according to the invention, in particular dishwashing detergents, preferably automatic dishwasher detergents, are characterized by a builder combination of citrate and carbonate and/or hydrogen carbonate. In one embodiment that is very particularly preferred according to the invention, a mixture of carbonate and citrate is used, the amount of carbonate preferably being from 5 to 40 wt. %, in particular from 10 to 35 wt. %, very particularly preferably from 15 to 30 wt. %, and the amount of citrate preferably being from 5 to 35 wt. %, in particular from 10 to 25 wt. %, very particularly preferably from 15 to 20 wt. %, in each case relative to the total amount of the cleaning agent, the total amount of these two builders preferably being 20 to 65 wt. %, in particular 25 to 60 wt. %, preferably from 30 to 50 wt. %. Moreover, one or more additional builders can also be contained.

The surfactant compositions according to the invention, in particular dishwashing detergents, preferably automatic dishwasher detergents, can contain phosphonates in particular as an additional builder. A hydroxy alkane and/or amino alkane phosphonate is preferably used as a phosphonate compound. Of the hydroxy alkane phosphonates, 1-hydroxyethane-1,1-diphosphonate (HEDP) has particular significance. Possible preferable aminoalkane phosphonates include ethylenediamine tetramethylene phosphonate (EDTMP), diethylenetriamine pentamethylene phosphonate (DTPMP) and the higher homologs thereof. Phosphonates are preferably contained in surfactant compositions according to the invention in amounts of from 0.1 to 10 wt. %, in particular in amounts of from 0.5 to 8 wt. %, very particularly preferably from 2.5 to 7.5 wt. %, in each case relative to the total weight of the composition.

The combined use of citrate, (hydrogen) carbonate, and phosphonate is particularly preferred. These can be used in the aforementioned quantities. In particular, amounts of 10 to 25 wt. % citrate, 10 to 30 wt. % carbonate (or hydrogen carbonate), and 2.5 to 7.5 wt. % phosphonate are used in this combination, in each case relative to the total weight of the agent.

Additional particularly preferred agents according to the invention, in particular washing or cleaning agents, preferably dishwashing detergents, more preferably automatic dishwasher detergents, are characterized in that, in addition to citrate and (hydrogen) carbonate and, in some cases, phosphonate, they contain at least one additional phosphorus-free builder. In particular, it is selected from aminocarboxylic acids, the additional phosphorus-free builder preferably being selected from methyl glycine diacetic acid (MGDA), glutamic acid diacetate (GLDA), aspartic acid diacetate (ASDA), hydroxyethyliminodiacetate (HEIDA), iminodisuccinate (IDS), and ethylenediamine disuccinate (EDDS), particularly preferably from MGDA or GLDA. An example of a particularly preferred combination is citrate, (hydrogen) carbonate, and MGDA as well as, optionally, phosphonate.

The proportion by weight of the additional phosphorous-free builder, in particular of the MGDA and/or GLDA, is preferably 0 to 40 wt. %, in particular 5 to 30 wt. %, most particularly 7 to 25 wt. %. The use of MGDA or GLDA, in particular MGDA, is particularly preferred as granular material. Advantageous in this regard are MGDA granules that contain as little water as possible and/or have a lower hygroscopicity (water absorption at 25° C., normal pressure) than non-granulated powders. The combination of at least three, in particular at least four, builders from the aforementioned group has proven to be advantageous for the cleaning and rinsing performance of agents according to the invention, in particular dishwashing detergents, preferably automatic dishwasher detergents. Besides those, additional builders can also be contained.

Polymeric polycarboxylates are also suitable as organic builders. These are, for example, the alkali metal salts of polyacrylic acid or polymethacrylic acid, for example those having a relative molecular mass of from 500 to 70,000 g/mol. Suitable polymers are in particular polyacrylates which preferably have a molecular mass of from 1,000 to 20,000 g/mol. Due to their superior solubility, the short-chain polyacrylates, which have molar masses of from 1,100 to 10,000 g/mol, and particularly preferably from 1,200 to 5,000 g/mol, can be preferred from this group.

The (homo)polymeric polycarboxylates contained in the agent according to the invention, in particular dishwashing detergent, preferably automatic dishwasher detergent, amount to preferably 0.5 to 20 wt. %, more preferably 2 to 15 wt. %, and in particular 4 to 10 wt. %.

The agents according to the invention, preferably as washing or cleaning agents, in particular dishwashing detergents, preferably automatic dishwasher detergents, can also contain, as a builder, crystalline layered silicates of general formula $NaMSi_xO_{2x+1} \cdot y\, H_2O$, where M represents sodium or hydrogen, x is a number from 1.9 to 22, preferably from 1.9 to 4, where 2, 3, or 4 are particularly preferred values for x, and y represents a number from 0 to 33, preferably from 0 to 20. It is also possible to use amorphous sodium silicates with a modulus $Na_2O: SiO_2$ of 1:2 to 1:3.3, preferably of 1:2 to 1:2.8 and in particular of 1:2 to 1:2.6, which are preferably delayed in dissolution and have secondary washing properties.

In specific agents according to the invention, in particular washing or cleaning agents, preferably dishwashing detergents, more preferably automatic dishwasher detergents, the silicate content, relative to the total weight of the composition, is limited to amounts below 10 wt. %, preferably below 5 wt. %, and in particular below 2 wt. %.

An optical brightener is preferably selected from the substance classes of distyrylbiphenyls, stilbenes, 4,4'-diamino-2,2'-stilbene disulfonic acids, cumarines, dihydroquinolones, 1,3-diarylpyrazolines, naphthalic acid imides, benzoxazole systems, benzisoxazole systems, benzimidazole systems, pyrene derivatives substituted with heterocycles, and mixtures thereof.

Particularly preferred optical brighteners include disodium-4,4'-bis-(2-morpholino-4-anilino-s-triazine-6-ylamino)stilbene disulfonate (for example available as Tinopal® DMS from BASF SE), disodium-2,2'-bis-(phenyl-styryl)disulfonate (for example available as Tinopal® CBS from BASF SE), 4,4'-bis[(4-anilino-6-[bis(2-hydroxyethyl)amino]-1,3,5-triazine-2-yl)amino]stilbene-2,2'-disulfonic acid (for example available as Tinopal® UNPA from BASF SE), hexasodium-2,2'-vinylenebis[(3-sulphonato-4,1-phenylene)imino[6-(diethylamino)-1,3,5-triazine-4,2-diyl]imino]bis-(benzene-1,4-disulfonate) (for example available as Tinopal® SFP from BASF SE), 2,2'-(2,5-thiophendiyl)bis[5-1,1-dimethylethyl)-benzoxazole (for example available as Tinopal® SFP from BASF SE) and/or 2,5-bis(benzoxazol-2-yl)thiophene.

It is preferable for the dye transfer inhibitor to be a polymer or a copolymer of cyclic amines such as vinylpyrrolidone and/or vinylimidazole. Polymers suitable as a dye transfer inhibitors include polyvinylpyrrolidone (PVP), polyvinylimidazole (PVI), copolymers of vinylpyrrolidone and vinylimidazole (PVP/PVI), polyvinylpyridine-N-oxide, poly-N-carboxymethyl-4-vinylpyridium chloride, polyethylene glycol-modified copolymers of vinylpyrrolidone and vinylimidazole, and mixtures thereof. Particularly preferably, polyvinylpyrrolidone (PVP), polyvinylimidazole (PVI) or copolymers of vinylpyrrolidone and vinylimidazole (PVP/PVI) are used as dye transfer inhibitors. The polyvinylpyrrolidones (PVP) used preferably have an average molecular weight of 2,500 to 400,000 and are commercially available from ISP Chemicals as PVP K 15, PVP K 30, PVP K 60 or PVP K 90, or from BASF as Sokalan® HP 50 or Sokalan® HP 53. The copolymers of vinylpyrrolidone and vinylimidazole (PVP/PVI) used preferably have a molecular weight in the range from 5,000 to 100,000. A PVP/PVI copolymer is commercially available from BASF under the name Sokalan® HP 56. Other dye transfer inhibitors that can be extremely preferably used are polyethylene glycol-modified copolymers of vinylpyrrolidone and vinylimidazole, which for example are available from BASF under the name Sokalan® HP 66.

In a preferred embodiment, the agents according to the invention, in particular dishwashing detergents, contain, as an additional component, at least one zinc salt as a glass corrosion inhibitor. The zinc salt can be an inorganic or organic zinc salt. The zinc salt preferably to be used according to the invention preferably has a solubility in water of greater than 100 mg/l, preferably greater than 500 mg/l, especially preferably greater than 1 g/l, and particularly greater than 5 g/l (all solubilities at 20° C. water temperature). The inorganic zinc salt is preferably selected from the group comprising zinc bromide, zinc chloride, zinc iodide, zinc nitrate, and zinc sulfate. The organic zinc salt is preferably selected from the group comprising zinc salts of monomeric or polymeric organic acids, particularly from the group of zinc acetate, zinc acetyl acetonate, zinc benzoate, zinc formiate, zinc lactate, zinc gluconate, zinc ricinoleate, zinc abietate, zinc valerate, and zinc-p-toluene sulfonate. In an embodiment that is particularly preferred according to the invention, zinc acetate is used as a zinc salt. The zinc salt is preferably contained in agents according to the invention in an amount of from 0.01 wt. % to 5 wt. %, especially preferably in an amount of from 0.05 wt. % to 3 wt. %, in particular in an amount of from 0.1 wt. % to 2 wt. %, relative to the total weight of the cleaning agent. In addition or alternatively to the aforementioned salts (particularly the zinc salts), polyethylene imines such as those which are available under the name Lupasol® (BASF) can preferably be used as glass corrosion inhibitors in an amount of from 0 to 5 wt. %, in particular 0.01 to 2 wt. %.

A third subject of the invention is a method for treating substrate surfaces, in particular hard surfaces or textile surfaces, in which at least one polymer according to the invention of the first subject of the invention is applied to the surface.

Preferred substrate surfaces are, in particular, surfaces of textiles (textile surfaces such as clothing, curtains, cushion covers, bed linen, towels), glass, stone (such as granite, marble), ceramics (such as dishes or tiles), enamel, metal (such as steel, stainless steel) or plastic. The term "hard surface" known to the person skilled in the art means surfaces that are compressible only to a slight extent or not at all, in particular surfaces made of glass, stone, ceramic, metal, enamel or hard plastic. The hard surfaces can in particular be typical household surfaces, such as the surface of tiles, floors, fittings, sinks, shower trays, bathtubs, toilets, shower cubicles, furniture such as tables, chairs, cupboards, work surfaces or other furniture, mirrors, windows, dishes, cutlery, glasses, porcelain objects or the surfaces of domestic appliances such as washing machines, dishwashers, cookers or extractor hoods.

In the method according to the invention, the polymer according to the invention of the first subject of the invention is preferably applied using an agent of the second subject of the invention. The method for substrate treatment according to the invention particularly preferably comprises the method steps
(a) providing a surfactant-containing liquor by mixing from 0.5 L to 40.0 L of water with an agent of the second subject of the invention, and
(b) bringing a substrate, in particular a textile or dishes, into contact with the surfactant-containing liquor produced according to (a).

Within the meaning of the invention, a surfactant-containing liquor is a liquid preparation for treating a substrate that can be obtained by using a surfactant-containing agent which has been diluted with at least one solvent (preferably water). Fabrics or textiles (such as clothing) can be used as substrates.

The agents according to the invention are preferably used to provide a surfactant-containing liquor for mechanical cleaning processes, as are carried out, for example, by a washing machine for textiles or a dishwasher.

A fourth subject of the invention is the use of at least one polymer according to the invention of the first subject of the invention for reducing dirt deposits on surfaces, in particular on hard surfaces or textile surfaces.

The invention is described by the following preferred aspects, without necessarily restricting the invention thereto:
1. A polymer containing at least one repeating unit of the formula (I) and at least one repeating unit of the formula (II) and, where applicable, further repeating units,

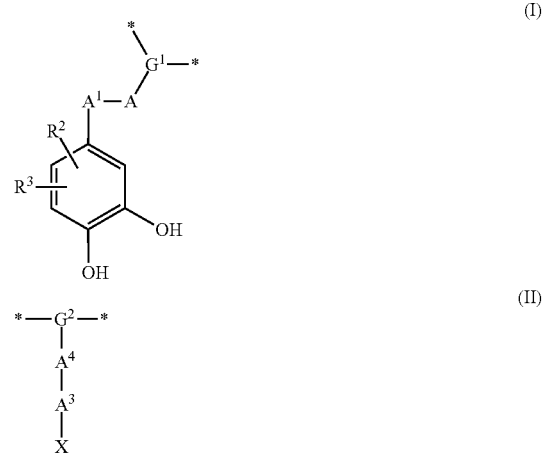

where
$G^1$ and $G^2$ independently of one another denote a structural unit which contributes to the polymer backbone,
A and $A^4$ independently of one another denote a spacer group of a side chain of the polymer or a direct bond,
$A^1$ denotes a linking group of the catechol radical from formula (I) to the spacer group A or a direct bond
$A^3$ denotes a linking group of the group X to the spacer group $A^4$ or a direct bond,
$R^2$ and $R^3$ independently represent a hydrogen atom, a $C_1$-$C_4$-alkyl group, a $C_2$-$C_4$ hydroxyalkyl group, a $C_1$-$C_4$-alkoxy group, a halogen atom, a sulfonic acid group, a $C_1$-$C_{10}$-alkylcarbonyloxy group, a $C_1$-$C_{10}$-alkoxycarbonyl group, a $C_6$-$C_{10}$-aryloxycarbonyl group, a $C_6$-$C_{10}$-arylcarbonyloxy group, $C_2$-$C_{10}$-alkenylcarbonyloxy group, a $C_2$-$C_{10}$-alkenyloxycarbonyl group, a hydroxyl group, an amino group, an ammonium group,
X represents an amino group —$N(R^5)(R^6)$ or an ammonio group —$N^+(R^5)(R^6)(R^7)$ $1/n\,An^{n-}$, where $R^5$, $R^6$ and $R^7$ each independently represent a hydrogen atom, a $C_1$-$C_4$-alkyl group or a $C_2$-$C_4$ hydroxyalkyl group and $1/n\,An^{n-}$ is an equivalent of an n-valent anion, preferably with n=1,
with the proviso that the repeating units of the formula (II) are different from the repeating units of the formula (I) and the molar ratio of the units of the formula (I) to the units of the formula (II) is in the range from 0.5-to-1 to 4-to-1, preferably 1-to-1 to 2-to-1.
2. The polymer according to aspect 1, characterized in that the amount of the units of the formula (I) and of the formula (II) is at least 50 mol %, relative to all repeating units contained in the polymer.
3. The polymer according to aspect 1 or aspect 2, characterized in that it has an average molecular weight (Mw) of 500 to 500000 g/mol, preferably of 2000 to 200000 g/mol.
4. The polymer according to any one of aspects 1 to 3, characterized in that $G^1$ and $G^2$ contribute to a polymer backbone which is selected from a polymer backbone, obtainable by polyaddition, polycondensation or by radical polymerization.
5. The polymer according to any one of the preceding aspects, characterized in that A according to formula (I) represents a carbonyl group, a carbonyloxy group, a carbonylimino group, an imino group, a $C_1$-$C_4$-alkyleneoxy group or a $C_1$-$C_4$-alkyleneimino group.

6. The polymer according to any one of the preceding aspects, characterized in that $A^4$ according to formula (II) represents a carbonyl group, a carbonyloxy group, a carbonylimino group, an imino group, a $C_1$-$C_4$-alkyleneoxy group, a $C_2$-$C_6$-α,ω-(dioxo)alkane-α,ω-diyl group, a $C_1$-$C_4$-alkyleneimino group or a $C_1$-$C_4$-alkyleneiminocarbonyl group.

7. The polymer according to any one of the preceding aspects, characterized in that $R^2$ and $R^3$ in formula (I) represent a hydrogen atom.

8. The polymer according to any one of the preceding aspects, characterized in that $A^1$ according to formula (I) represents a direct bond, a $C_1$-$C_4$-alkanediyl group or a $C_1$-$C_4$-alkyleneoxycarbonyl group.

9. The polymer according to any one of the preceding aspects, characterized in that $A^3$ according to formula (II) represents a direct bond, a $C_1$-$C_6$-alkanediyl group or a $C_2$-$C_6$-α,ω-(dioxo)alkane-α,ω-diyl group.

10. The polymer according to any one of the preceding aspects, characterized in that it contains at least one repeating unit of the formula (I-a) as the repeating unit of the formula (I),

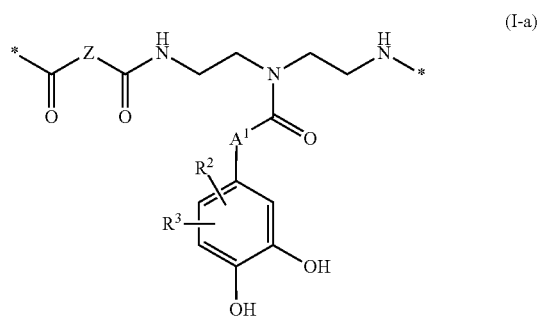

(I-a)

where
$A^1$ represents a $C_1$-$C_4$-alkanediyl group (preferably ethane-1,2-diyl),
Z represents a $C_2$-$C_8$-alkanediyl group (preferably ethane-1,2-diyl),
$R^2$ and $R^3$ independently of one another represent a hydrogen atom, a $C_1$-$C_4$-alkyl group, a $C_2$-$C_4$ hydroxyalkyl group, a $C_1$-$C_4$-alkoxy group, a halogen atom, a sulfonic acid group (preferably in each case a hydrogen atom).

11. The polymer according to any one of the preceding aspects, characterized in that it contains at least one repeating unit of the formula (II-a) as the repeating unit of the formula (II),

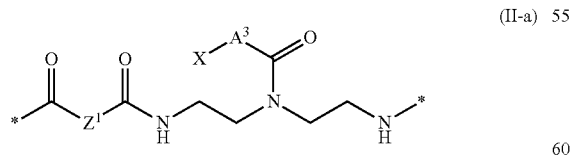

(II-a)

where
$A^3$ represents a $C_1$-$C_6$-alkanediyl group,
$Z^1$ represents a $C_2$-$C_8$-alkanediyl group (preferably ethane-1,2-diyl),
X represents an amino group —N($R^5$)($R^6$) or an ammonio group —N$^+$($R^5$)($R^6$)($R^7$) 1/n An$^{n-}$, where $R^5$, $R^6$ and $R^7$ each independently of one another represent a hydrogen atom, a $C_1$-$C_4$-alkyl group or a $C_2$-$C_4$ hydroxyalkyl group and 1/n An$^{n-}$ is an equivalent of an n-valent anion, preferably with n=1.

12. The polymer according to any one of the preceding aspects, characterized in that it contains at least one repeating unit of the formula (II-b) as the repeating unit of the formula (II),

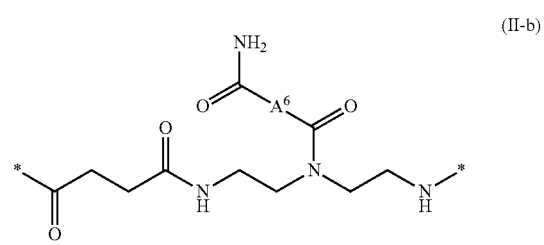

(II-b)

where $A^6$ represents a ($C_2$ to $C_6$)-alkanediyl group.

13. The polymer according to any one of the aspects 1 to 12, characterized in that it contains at least one repeating unit of the formula (II-c) as the repeating unit of the formula (II),

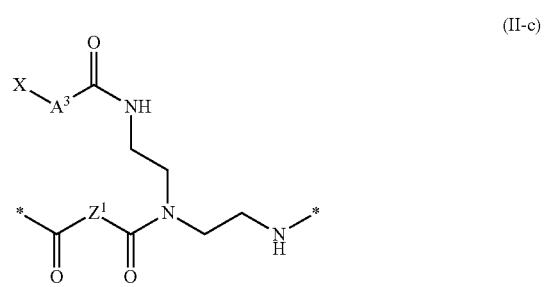

(II-c)

where
$A^3$ represents a $C_1$-$C_6$-alkanediyl group,
$Z^1$ represents a $C_2$-$C_8$-alkanediyl group (preferably ethane-1,2-diyl),
X represents an amino group —N($R^5$)($R^6$) or an ammonio group —N$^+$($R^5$)($R^6$)($R^7$) 1/n An$^{n-}$, where $R^5$, $R^6$ and $R^7$ each independently of one another represent a hydrogen atom, a $C_1$-$C_4$-alkyl group or a $C_2$-$C_4$ hydroxyalkyl group and 1/n An$^{n-}$ is an equivalent of an n-valent anion, preferably with n=1.

14. The polymer according to any one of aspects 1 to 13, characterized in that it contains at least one repeating unit of the formula (II-d) as the repeating unit of the formula (II),

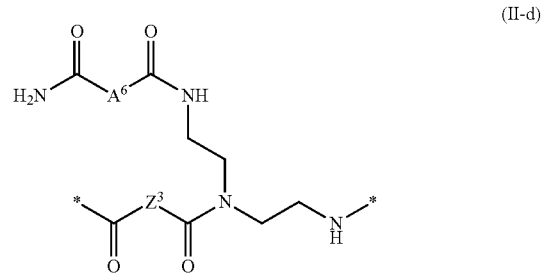

(II-d)

where $A^6$ represents a ($C_2$ to $C_6$)-alkanediyl group, in particular ethane-1,2-diyl, propane-1,3-diyl, butane-1, 4-diyl, propane-1,2-diyl, butane-1,2-diyl, butane-1,3-diyl, pentane-1,5-diyl or hexane-1,6-diyl, $Z^3$ represents a $C_2$-$C_8$-alkanediyl group (preferably ethane-1,2-diyl).

15. The polymer according to any one of aspects 1 to 14, characterized in that it contains at least one structural unit of the formula (III) as (preferably the only) further repeating unit,

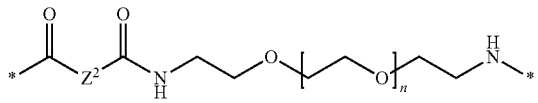

(III)

where n is a number from 1 to 10 and $Z^2$ represents a $C_2$ to $C_8$-alkanediyl group (preferably ethane-1,2-diyl).

16. The polymer according to aspect 15, characterized in that the repeating units according to formula (III) are contained in an amount of less than 50 mol %.

17. The polymer according to any one of the aspects 1 to 11, characterized in that it contains at least one repeating unit of the formula (I-c) as the repeating unit of the formula (I),

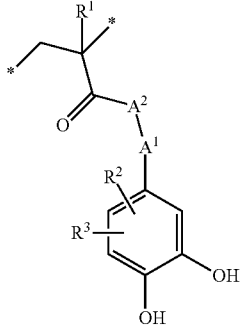

(I-c)

where
$R^1$ represents a hydrogen atom or a methyl group,
$A^2$ represents an oxygen atom or a group —NH—, preferably a group —NH—,
$R^2$, $R^3$, and $A^1$ are as defined in the previous aspects.

18. The polymer according to any one of the aspects 1 to 9 and 17, characterized in that it contains at least one repeating unit of the formula (II-e) as the repeating unit of the formula (II),

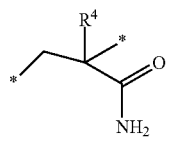

(II-e)

where
$R^4$ represents a hydrogen atom or a methyl group,
$A^5$ represents an oxygen atom or a group —NH—,
$A^3$ represents a $C_2$-$C_6$-alkanediyl group, X represents an amino group —N($R^5$)($R^6$) or an ammonio group —N$^+$($R^5$)($R^6$)($R^7$) 1/n An$^{n-}$, where $R^5$, $R^6$ and $R^7$ each independently represent a hydrogen atom, a $C_1$-$C_4$-alkyl group or a $C_2$-$C_4$ hydroxyalkyl group and 1/n An$^{n-}$ is an equivalent of an n-valent anion, preferably with n=1, 19. The polymer according to aspect 18, characterized in that $R^5$, $R^6$ and $R^7$ of the formula (II-e) each represent a methyl group.

20. The polymer according to any one of the aspects 1 to 9 and 17 to 19, characterized in that it contains at least one repeating unit of the formula (II-f) or its trimethylammonium salt as the repeating unit of the formula (II),

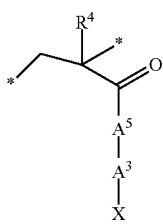

(II-f)

where
$R^4$ represents a hydrogen atom or a methyl group,
$A^5$ represents an oxygen atom or a group —NH—,
m represents 2 or 3.

21. The polymer according to any one of the aspects 1 to 9 and 17, characterized in that it contains at least one repeating unit of the formula (II-g) as the repeating unit of the formula (II), (II-g)

where
$R^4$ represents a hydrogen atom or a methyl group.

22. The polymer according to any one of the aspects 1 to 9 and 17 to 21, characterized in that it contains at least one structural unit of the formula (IV) as (preferably the only) further repeating unit, (IV)

where
$R^8$ represents a hydrogen atom or a methyl group,
$A^5$ represents an oxygen atom or a group —NH—,
$R^9$ represents a hydroxy-terminated polyalkylene oxide group, a $C_1$-$C_4$-alkyl-terminated polyalkylene oxide group, a $C_2$-$C_6$ hydroxyalkyl group, a $C_3$-$C_6$ polyhydroxyalkyl group, a $C_1$-$C_6$-alkyl group, a $C_1$-$C_4$-alkoxy-$C_2$-$C_4$-alkyl group, a 2-hydroxyethyl group, a 2-hydroxypropyl group, a 2-methyl-1-propanesulfanoic acid group and its sodium salt, an N-[tris(hydroxymethyl)methyl] group, a 2-carboxyethyl group and/or a 3-sulfopropyl group.

23. An agent for the treatment of surfaces, in particular hard surfaces or textiles, characterized in that it contains at least one polymer according to any one of the aspects 1 to 22 and at least one surfactant.

24. The agent according to aspect 23, characterized in that it is liquid.

25. The agent according to any one of the aspects 23 or 24, characterized in that it contains at least one organic solvent.

26. A method for the treatment of substrate surfaces, in particular hard surfaces or textile surfaces, in which at least one polymer defined in one of the aspects 1 to 22 is applied to the surface.

27. The method according to aspect 26, characterized in that said polymer is applied using an agent according to any one of the aspects 22 to 27.

28. Use of at least one polymer defined according to any one of the aspects 1 to 22 for reducing dirt deposits on surfaces, in particular on hard surfaces or textile surfaces.

EXAMPLES

The following chemicals were used in the experiments:
DCM Dichloromethane
THF tetrahydrofurane
Fmoc-OSu N-(9-fluorenylmethoxycarbonyloxy) succinimide
DMF dimethylformamide
PEG polyethylene glycol
EDC N-(3-dimethylaminopropyl)-N'-ethyl carbodiimide
TBO toluidine blue O 1. Synthesis of 4-((2-((((9H-fluoren-9-yl) methoxy) carbonyl) amino) ethyl)(2-(tritylamino)ethyl) amino)-4-oxobutanoic acid (2)

1.1 Synthesis of $N^1$-(2-aminoethyl)-$N^2$-tritylethane-1,2-diamine(1)

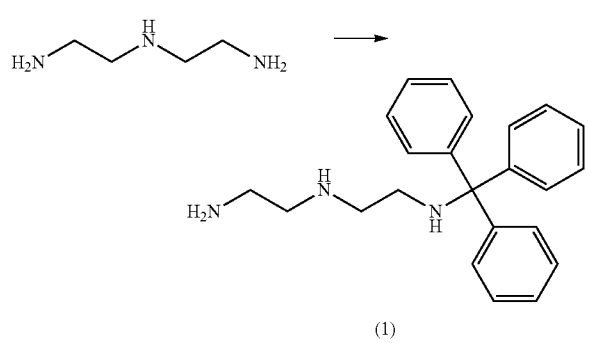

(1)

A solution of trityl chloride (70 g, 0.25 mol) in 250 ml of DCM was added dropwise to a solution of diethylenetriamine (135 ml, 1.25 mol) in 1000 ml of DCM over a period of 2 hours at 0° C. The reaction was stirred at room temperature for 16 hours, and then the reaction solution was washed with a saturated $NaHCO_3$ solution. The organic phase was dried over magnesium sulfate and the solvent was then removed on a rotary evaporator under reduced pressure. Product 1 was obtained as a brown oil with a yield of 87 g (0.25 mol, 100%).

1.2 Synthesis of 4-((2-((((9H-fluoren-9-yl)methoxy) carbonyl)amino)ethyl)(2-(tritylamino)ethyl)amino)-4-oxobutanoic acid (2)

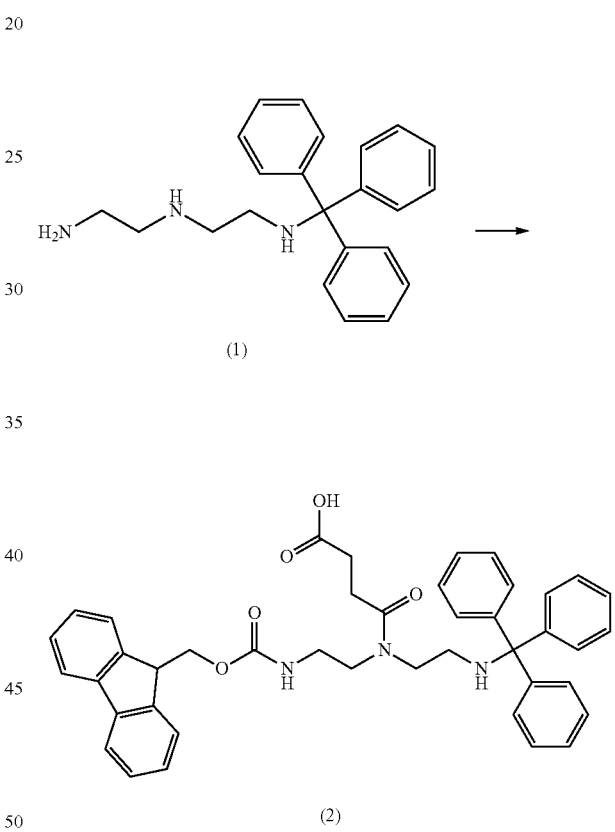

(2)

$N^1$-(2-aminoethyl)-$N^2$-tritylethane-1,2-diamine(1) (30 g, 87 mmol) was dissolved in 300 ml THF and 30 ml triethylamine. A solution of Fmoc-OSu (29.3 g, 87 mmol) in 300 ml of THF was then added dropwise at −78° C. over a period of 2 hours. Then, succinic anhydride (11.3 g, 113 mmol) was added and the reaction was stirred at room temperature for 16 hours. The reaction solution was washed with an aqueous citric acid solution and the organic phase was dried over magnesium sulfate. The solvent was removed on the rotary evaporator under reduced pressure. The crude product was recrystallized in DCM and the product 2 was obtained as a white powder with a yield of 35 g (52 mmol, 60%).

2. Synthesis of 7-(3-(3,4-dimethoxyphenyl)propanoyl)-1-(9H-fluoren-9-yl)-3,11-dioxo-2-oxa-4,7,10-triazatetradecan-14-oic acid (6)

2.1 Synthesis of N¹-(2-aminoethyl)-N²-tritylethane-1,2-diamine(1)

This synthesis is described in point 1.1 of this example section (see above).

2.2 Synthesis of 3-(3,4-dimethoxyphenyl)propionic acid chloride (3)

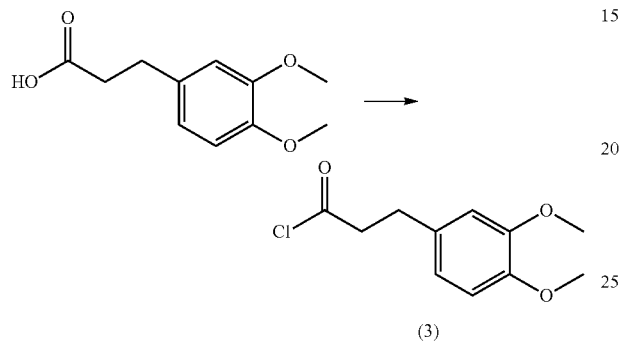

(3)

3-(3,4-dimethoxyphenyl)-propionic acid (10 g, 48 mmol) was dissolved in 100 ml DCM and 2 ml DMF. The solution was cooled to 0° C. and then oxalyl chloride (6 ml, 70 mmol) was added. The reaction was stirred for 16 hours at room temperature. The solvent was then removed on a rotary evaporator under reduced pressure and the product 3 was obtained as a red oil with a yield of 12 g (crude product).

2.3 Synthesis of (9H-fluoren-9-yl)methyl(2-(3-(3,4-dimethoxyphenyl)-N-(2-(tritylamino)ethyl)propane-amido)ethyl)carbamate(4)

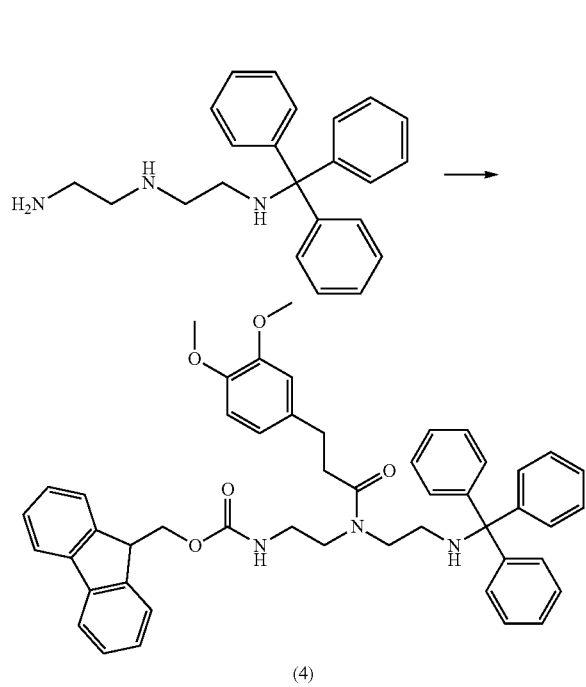

(4)

N¹-(2-aminoethyl)-N²-tritylethane-1,2-diamine (1) (14.8 g, 43 mmol) was dissolved in 150 ml THF and 15 ml triethylamine. A solution of Fmoc-OSu (14.6 g, 43 mmol) in 150 ml of THF was then added dropwise at −78° C. over a period of 2 hours. Then 3-(3,4-dimethoxyphenyl)propionyl chloride (3) (12 g, crude product) was added and the reaction was stirred at room temperature for 16 hours. The reaction solution was washed with a saturated $NaHCO_3$ solution and the organic phase was dried over magnesium sulfate. The solvent was removed under reduced pressure on a rotary evaporator in order to obtain the product 4 as a brown oil with a yield of 40 g (crude product).

2.4 Synthesis of (9H-fluoren-9-yl)methyl(2-(N-(2-aminoethyl)-3-(3,4-dimethoxyphenyl)propane-amido)ethyl)carbamate (5)

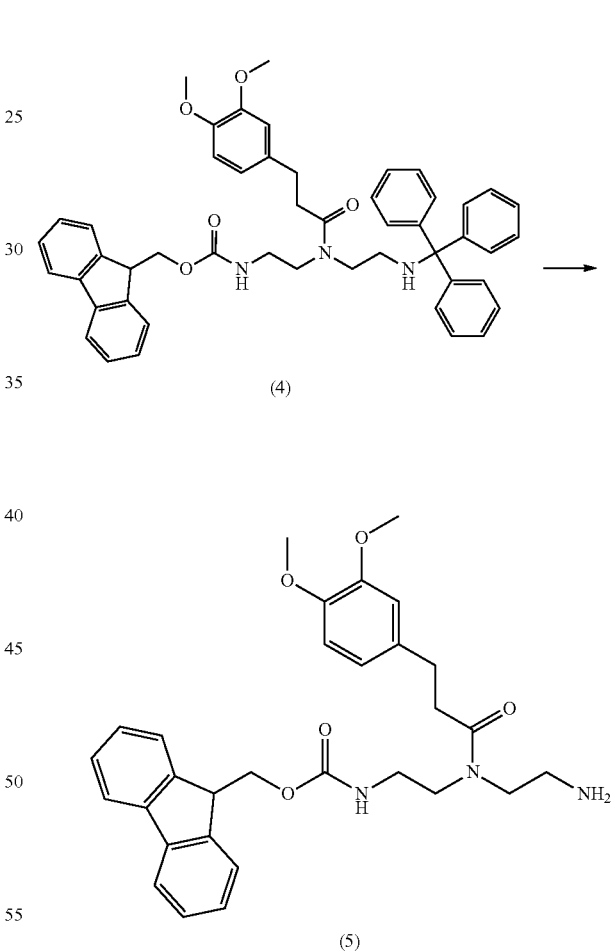

(9H-fluoren-9-yl)methyl(2-(3-(3,4-dimethoxyphenyl)-N-(2-(tritylamino)ethyl)propane-amido)ethyl)carbamate (4) (40 g, crude product) was dissolved in 600 ml DCM. Then 70 ml of trifluoroacetic acid and 7 ml of triethylsilane were added. The reaction was stirred at room temperature for 2 hours. The reaction solution was then precipitated in diethyl ether. After decanting off the diethyl ether, the product 5 was obtained as a brown oil with a yield of 35 g (crude product).

2.5 Synthesis of 7-(3-(3,4-dimethoxyphenyl)propanoyl)-1-(9H-fluoren-9-yl)-3,11-dioxo-2-oxa-4,7,10-triazatetradecan-14-oic acid (6)

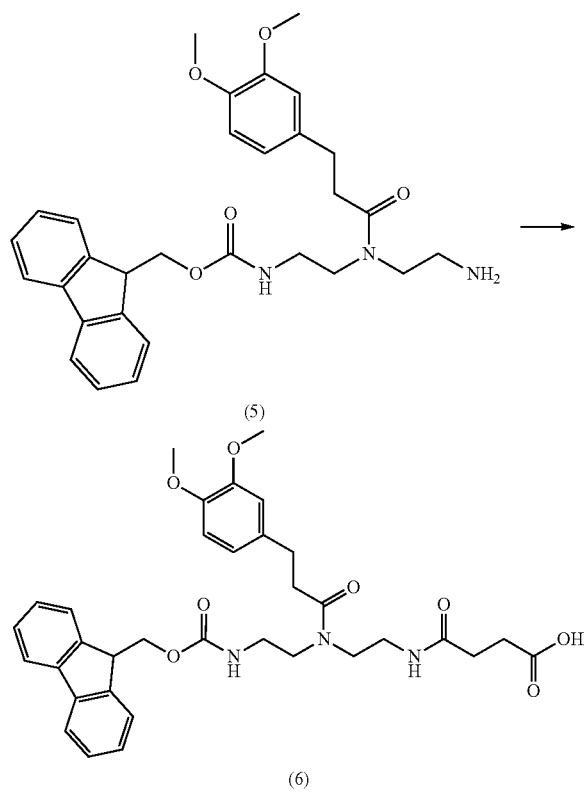 [SMILES: COc1ccc(CCC(=O)N(CCN)CCNC(=O)OCC2c3ccccc3-c3ccccc32)cc1OC ; COc1ccc(CCC(=O)N(CCNC(=O)CCC(=O)O)CCNC(=O)OCC2c3ccccc3-c3ccccc32)cc1OC]

(9H-fluoren-9-yl)methyl (2-(N-(2-aminoethyl)-3-(3,4-dimethoxyphenyl)propanamido)ethyl)carbamate(5) (35 g, crude product) was dissolved in 500 ml DCM and 20 ml of triethylamine. Then succinic anhydride (5.5 g, 55 mmol) was added and the reaction was stirred for 16 hours at room temperature. The reaction solution was then washed with an aqueous citric acid solution and the organic phase was dried over magnesium sulfate. The solvent was removed under reduced pressure on a rotary evaporator and the crude product was recrystallized in acetone and toluene in a ratio of 1:1. The product 6 was obtained as a white powder with a yield of 12 g (19.5 mmol, 45%).

3. Polymer Synthesis on the Solid Phase

Using the components synthesized under points 1 and 2 of this example section, according to the protocol from Ponader, Daniela, et al. "Sequence-defined glycopolymer segments presenting mannose: synthesis and lectin binding affinity." Biomacromolecules 13.6 (2012): 1845-1852 (see in particular p. 1848, 2nd column, penultimate paragraph and Scheme 1) on the solid phase (commercially available Tentagel S Ram Resin) developed into polymers.

If the polymers bonded to the solid phase contained a trityl protective group, the trityl component was removed from the solid phase according to Palladino, Pasquale, and Dmitry A. Stetsenko. "New TFA-free cleavage and final deprotection in Fmoc solid-phase peptide synthesis: dilute HCl in fluoro alcohol." Organic letters 14.24 (2012): 6346-6349 selectively deprotected. After deprotection, the free amine was reacted with the following acids in order to obtain a corresponding tertiary amine or primary amide.

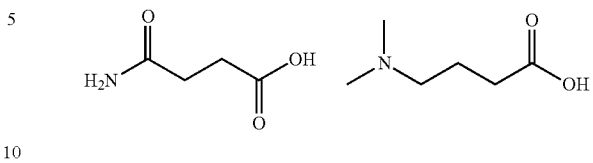

The procedure was analogous to point 2.5 (see above). As a last step, the methoxy protective groups were deprotected with the release of the catechol hydroxyl groups according to known instructions (see above).

The following polymers were prepared from the above-described monomers 4-((2-((((9H-fluoren-9-yl)methoxy)carbonyl)amino)ethyl)(2-(tritylamino)ethyl)amino)-4-oxobutanoic acid (2), 7-(3-(3,4-dimethoxyphenyl)propanoyl)-1-(9H-fluoren-9-yl)-3,11-dioxo-2-oxa-4,7,10-triazatetradecan-14-oic acid (6) and 1-(9H-fluoren-9-yl)-3,14-dioxo-2,7,10-trioxa-4,13-diazaheptadecan-17-oic acid (see illustration: Biomacromolecules 13.6 (2012): 1845-1852 in the Supporting Information) synthesized:

| Polymer | Sequence |
|---------|----------|
| VP1 | $H_2N$-CO-(Cat)-(EDS)-(EDS)-(EDS)-(EDS)-(EDS)-$NH_2$ |
| EP1 | $H_2N$-CO-(IIc-amine)-(EDS)-(Cat)-(EDS)-(EDS)-(EDS)-$NH_2$ |
| EP2 | $H_2N$-CO-(Cat)-(EDS)-(IIc-amine)-(EDS)-(Cat)-(EDS)-$NH_2$ |
| EP3 | $H_2N$-CO-(IId-Amid)-(EDS)-(Cat)-(EDS)-(EDS)-(EDS)-$NH_2$ |
| EP4 | $H_2N$-CO-(Cat)-(EDS)-(IId-Amid)-(EDS)-(Cat)-(EDS)-$NH_2$ |
| EP5 | $H_2N$-CO-(Cat)-(EDS)-(Cat)-(EDS)-(EDS)-(EDS)-$NH_2$ |

4. Determination of the Adhesion Energy of the Polymer According to the Invention by Means of an Adhesion Probe on Model Surfaces In order to check the quality of the adhesion of the polymers according to the invention, the contact angle determinations known to the person skilled in the art can be carried out for this purpose (cf. R. S. Hebbar, A. M. Isloor, A. F. Ismail in: "Membrane Charaterization" (Elsevier Verlag), ISBN 978-0-444-63776-5, Published: 2017, pages 219-255).

However, it is also possible to use the adhesion probes provided with the polymers according to the invention to measure the adhesion energy by means of reflection-interference-contrast microscopy (RICM) and to determine the adhesion energies therefrom using the Johnson, Kendall and Roberts (JKR) model. This method, which is also known to the person skilled in the art, was carried out on the polymers according to the invention as described below.

4.1 Creation of Adhesion Probes with Polymers According to the Invention

4.1.1 Synthesis of Poly(Ethylene Glycol)-Diacrylamide Hydrogel Particles

Poly(ethylene glycol)-based deformable hydrogel particles were produced by dispersion polymerization. For this purpose, PEG-diacrylamide (Mn=8000 g/mol) (50 mg) was first completely dissolved in 5 ml of water and then 5 ml of a 2 M sodium sulfate solution was added in order to obtain a dispersion with a concentration of 0.5 wt. % PEG. The PEG-diacrylamide was previously described according to a synthesis published by Hartmann et al. (Biomed. Mater. Res., Part B, 2011, 98B, 8-17). Irgacure 2959 was used as the UV photoinitiator and added to the dispersion in a concentration of 0.01 wt. % (1 mg), shaken and then photopolymerized under UV radiation (Hereaus HiLite) for 180 seconds.

Figure 2:
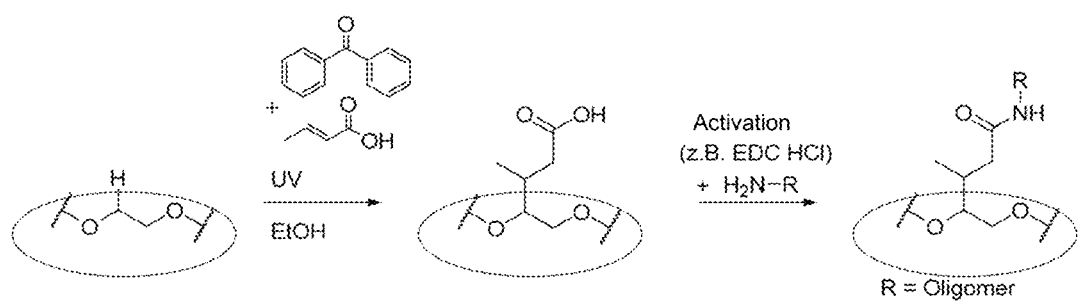
FIG. 2 illustrates the washing process of the hydrogel particles.

4.1.2 Functionalization of the Hydrogel Particles with Crotonic Acid as a Coupling Group Water as the continuous phase of the poly(ethylene glycol)-diacrylamide dispersion was replaced by ethanol and benzophenone (3 wt. %, 250 mg) and crotonic acid (19 wt. %, 1.5 g) were added. The dispersion was then flushed with nitrogen for 60 s and then irradiated with UV light for 90 seconds. This process was repeated 10 times. The hydrogel particles were washed three times with ethanol, ethanol-water in a volume ratio of 1:1 and with water and stored in water at 4° C. (FIG. 2).

4.1.3 Functionalization of the Hydrogel Particles with Polymers According to the Invention or Comparative Polymers To functionalize the crotonic acid-functionalized hydrogel particles, the water was exchanged for 2-(N-morpholino)ethanesulfonic acid buffer (MES, pH 4.5, 0.1 M) by repeated centrifugation/washing. The hydrogel particles (0.02 g) were then dispersed in 2 mL MES buffer. The polymer to be fixed (33 mg) was dissolved in 5 mL of the MES buffer and added to the hydrogel particle dispersion. N-(3-dimethylaminopropyl)-N'-ethylcarbodiimide (EDC) hydrochloride was used as the coupling reagent to activate the crotonic acid. EDC was first dissolved in ultrapure water at a concentration of 10 wt. % (100 mg) and then added to the dispersion. The reaction was carried out at room temperature for 2 hours with shaking. The reaction solution was then removed by centrifugation and the functionalization step was repeated a second time. The particles were then washed three times with water and stored in water at 4° C.

The degree of functionalization of the hydrogel particles functionalized with (a polymer according to the invention) was determined by coloring with the dye toluidine blue O. This cationic dye binds to carboxyl groups and thus shows the degree of polymer functionalization by comparing the coloring of crotonic acid hydrogel particles and with polymer-functionalized hydrogel particles (according to the invention). For this purpose, 0.2 mL of the respective particles in 1.5 mL Eppendorf Tubes® (Eppendorf, Germany) were given and centrifuged. The supernatant was removed and 0.2 mL of a 0.3125 M TBO solution at pH 10.5 (NaOH) was added to the particles. The Eppendorf Tubes® were wrapped in aluminum foil and shaken for 18 h. The hydrogel particles were then centrifuged, and the supernatant was removed and washed with 1 mL in water at pH 10.5 (NaOH). To quantify the color, optical microscopy (Olympus IX73, Olympus Europa SE & Co. KG) was carried out with a CMOS camera (DMK 23UX174, Imaging Source Europe GmbH). The differences in the gray values of the crotonic acid particles and hydrogel particles functionalized with polymer (according to the invention) yield the relative degrees of functionalization. The absolute degree of functionalization of the crotonic acid hydrogel particles (Example 1B) was previously determined colorimetrically by means of UV titration with TBO. The described procedure for crotonic acid functionalization typically results in a degree of functionalization of 90 µmol/g.

According to the above specification, hydrogel particles were functionalized with the following polymers:

| Hydrogel particle | Polymer | Polymer used for functionalization |
|---|---|---|
| H1 | Comparison polymer | VP1 |
| H2 | according to the invention | EP1 |
| H3 | according to the invention | EP2 |

4.2 Determination of the Modulus of Elasticity of the Hydrogel Particles

Force-deformation curves were measured using Colloidal-Probe AFMs of the hydrogel particles functionalized with the polymer according to the invention and analyzed with the Hertz model:

$$F = 4/3 \cdot R^{1/2} \cdot E \cdot D/(1-v^2)$$

where F is the force, D is the deformation, v is the Poisson ratio. R, the effective radius is calculated from the radii of the hydrogel particle and the colloidal AFM probe. The hydrogel particles show average elastic moduli of 100±18 kPa. The measurements were carried out with a Nanowizard II (JPK Instruments AG) and self-made colloidal probe cantilevers (CSC 38, Mikromash, Bulgaria). To produce the Colloidal Probe Cantilever, microparticles (R=4.8 µm, Microparticles GmbH) were glued to the cantilever with epoxy resin (UHU Plus Schnellfest, UHU GmbH& Co. KG).

4.3 Preparation of Model Surfaces for Glass and Cotton

4.3.1 Preparation of Glass Surfaces

µ-Slide 8 Well Glass Bottom (ibidi GmbH, Planegg/Martinsried Germany) was used as the glass surface for the adhesion measurements. In preparation, a µ-Slide 8 Well Glass Bottom was cleaned in a UV Ozone Cleaner UVC.1014 (NanoBioAnalytics, Germany) for 30 minutes.

4.3.2 Preparation of Cellulose-Imitating Surfaces

To prepare cellulose-imitating surfaces, a glass surface was placed in a solution of ethanol (200 mL), water (10.5 mL), acetic acid (0.2 mL) and (3-glycidyloxypropyl)trimethoxysilane (2.1 mL) and reacted for 2 h at room temperature. The surface was then washed with ethanol and annealed at 80° C. for 12 h in a drying cabinet. For further functionalization, 0.3 mL of a D-cellobiose or carboxymethyl cellulose solution (1 wt. %) in phosphate buffer (10 mM, pH 8.0-8.5) was added to the chambers of the µ-slides. After 2 h of reaction at room temperature, the solution was removed and the surfaces washed three times with water.

5. Adhesion Energy Determination

5.1 Determination of the Adhesion Energy Between Adhesion Probes and Surfaces The analysis of the adhesion of a polymer having two catechol units to glass (FIG. 3 A) and to D-cellobiose (FIG. 3 B) is shown here as an example. Phosphate buffer (pH 8.0, 10 mM) for glass surfaces and diluted NaOH (pH 8.5) for cellobiose surfaces were used as measuring media. To determine the adhesion energies, the corresponding polymer was bonded to hydrogel particles as described under point 4 (see above) and the adhesion surfaces of the hydrogels on the respective surface were analyzed using reflection-interference-contrast microscopy (RICM). The adhesion energies were then evaluated using the Johnson, Kendall and Roberts (JKR) model:

$$\alpha^3 = 6\pi^*(W_{adh}/E_{eff})^*R^2.$$

In this context, $\alpha$ is the contact radius, $W_{adh}$ the adhesion energy, R is the hydrogel particle radius and $E_{eff}$ is the effective modulus of elasticity $E_{eff}=[4E/3(1-v^2)]$.

Figure 3C:
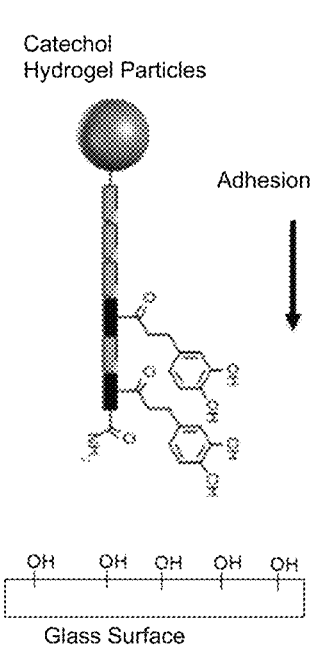
FIG. 3C illustrates the measurement of contact areas and particle radii for a data point, fitted with the JKR model, with the polymer-functionalized hydrogel particles showing approximately equal adhesion energies on the glass or cellobiose surface.
Figure 3C:
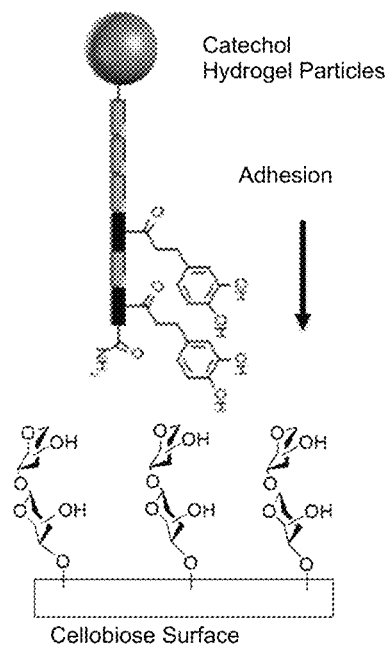
Figure 3C:
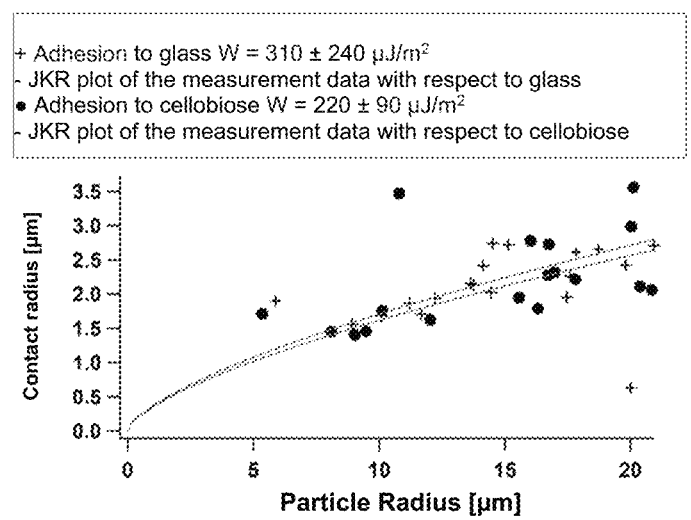

RICM was performed with an Olympus IX73 inverted microscope (Olympus IX73, Olympus Europa SE & Co. KG) at a wavelength of 533 nm (LED illumination, COP1-A Thorlabs GmbH). A filter cube with a semi-transparent mirror, a quarter-wave plate and polarizers (optical components Thorlabs GmbH) was used to generate the interference pattern. An Olympus UplanFL N 60x/0.90 lens (Olympus Europa SE & Co. KG) and an imaging source DMK 23UX174 (Imaging Source Europe GmbH) camera were used to capture the RICM interference pattern. To carry out the calculations according to the JKR model, the radii of the contact surface and the particles were measured (FIG. 1). For this purpose, images of the interference pattern were first recorded with micromanager (v1.4.16, Open Imaging Inc.) and the interference profiles were automatically generated with a self-written image recognition program. The contact radii and adhesion energies were then calculated using a script-based analysis with the IgorPro program (WaveMetrics, USA). At least 10 contact areas and particle radii were measured for a data point, plotted against each other and fitted with the JKR model (FIG. 3C). The polymer-functionalized hydrogel particles show approximately equal adhesion energies on the glass or cellobiose surface.

The adhesion energy in RICM of the examined polymers was also determined according to the above protocol from a wash liquor (Persil Color® (Henkel AG & Co. KGaA) diluted to 4.1 g/L) on the cellobiose model surface. The determined adhesion energy in RICM against the ratio of catechol to amine of the respective hydrogel particle (H1) to (H3) is indicated below:

| Relationships of the functionalities | | Adhesion energy |
| --- | --- | --- |
| Catechol/amine | Hydrogel particles | [µmol/m²] |
| 1/0 | (H1) | 0 |
| 1/1 | (H2) | 310 |
| 2/1 | (H3) | 370 |

What is claimed is:

1. A polymer containing at least one repeating unit of the formula (I) and at least one repeating unit of the formula (II) and, where applicable, further repeating units,

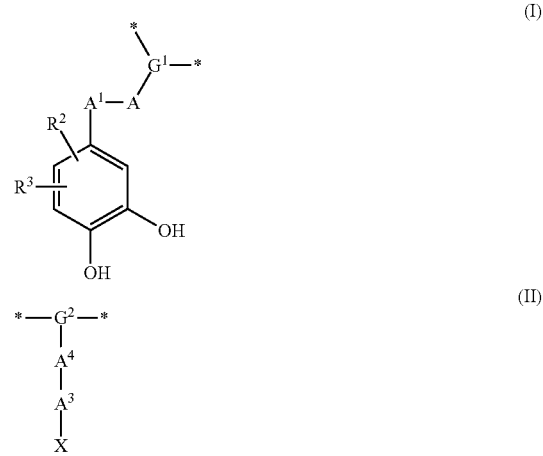

where
G¹ and G² independently of one another represent a structural unit which contributes to the polymer backbone,
wherein
(1) G¹ according to formula (I) has the formula:

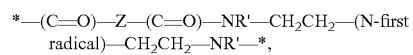

where each R' independently represents H or $C_1$-$C_4$-alkyl, Z represents a $C_2$-$C_8$-alkanediyl group, and "first radical" represents the dihydroxyphenyl radical bonded via A/A¹ according to formula (I); and
(2) G² according to formula (II) has the formula:

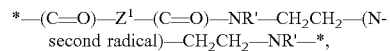

where each R' independently represents H or $C_1$-$C_4$-alkyl, Z represents a $C_2$-$C_8$-alkanediyl group, and "second radical" represents —A⁴-A³-X according to formula (II),
A and A⁴ independently of one another denote a spacer group of a side chain of the polymer or a direct bond,
A¹ denotes a linking group of the catechol radical from formula (I) to the spacer group A or a direct bond,
A³ denotes a linking group of the group X to the spacer group A⁴ or a direct bond,
R² and R³ independently represent a hydrogen atom, a $C_1$-$C_4$-alkyl group, a $C_2$-$C_4$ hydroxyalkyl group, a $C_1$-$C_4$-alkoxy group, a halogen atom, a sulfonic acid group, a $C_1$-$C_{10}$-alkylcarbonyloxy group, a $C_1$-$C_{10}$-alkoxycarbonyl group, a $C_6$-$C_{10}$-aryloxycarbonyl group, a $C_6$-$C_{10}$-arylcarbonyloxy group, $C_2$-$C_{10}$-alkenylcarbonyloxy group, a $C_2$-$C_{10}$-alkenyloxycarbonyl group, a hydroxyl group, an amino group, an ammonium group,
X represents an amino group —N(R⁵)(R⁶) or an ammonio group —N⁺(R⁵)(R⁶)(R⁷) 1/n An$^{n-}$,
where R⁵, R⁶ and R⁷ each independently represent a hydrogen atom, a $C_1$-$C_4$-alkyl group or a $C_2$-$C_4$ hydroxyalkyl group and 1/n An$^{n-}$ represents an equivalent of an n-valent anion,
with the proviso that the repeating units of the formula (II) are different from the repeating units of the formula (I) and the molar ratio of the units of the formula (I) to the units of the formula (II) is in the range from 0.5-to-1 to 4-to-1.

2. The polymer according to claim 1, wherein at least one of A and $A^1$ and/or at least one of $A^3$ and $A^4$ represents a spacer group.

3. The polymer according to claim 1, wherein
   (1) A according to formula (I) represents a carbonyl group, a carbonyloxy group, a carbonylimino group, an imino group, a $C_1$-$C_4$-alkyleneoxy group or a $C_1$-$C_4$-alkyleneimino group; and/or
   (2) $A^4$ according to formula (II) represents a carbonyl group, a carbonyloxy group, a carbonylimino group, an imino group, a $C_1$-$C_4$-alkyleneoxy group, a $C_2$-$C_6$-α,ω-(dioxo)alkane-α,ω-diyl group, a $C_1$-$C_4$-alkyleneimino group or a $C_1$-$C_4$-alkyleneiminocarbonyl group.

4. The polymer according to claim 1, wherein
   (1) $A^1$ according to formula (I) represents a direct bond, a $C_1$-$C_4$-alkanediyl group, a $C_1$-$C_4$-alkyleneoxycarbonyl group; and/or
   (2) $A^3$ according to formula (II) represents a direct bond, a $C_1$-$C_6$-alkanediyl group, a $C_2$-$C_6$-α,ω-(dioxo)alkane-α,ω-diyl group.

5. The polymer according to claim 1, wherein it contains at least one repeating unit of the formula (I-a) as the repeating unit of the formula (I),

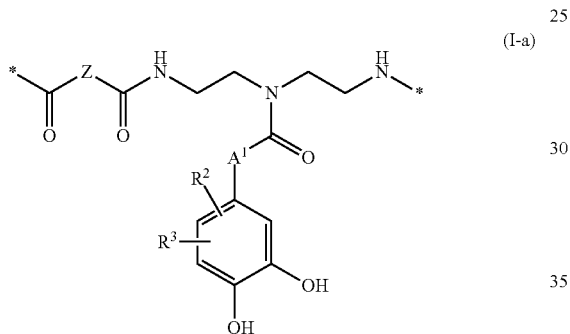

where
$A^1$ represents a $C_1$-$C_4$-alkanediyl group,
Z represents a $C_2$-$C_8$-alkanediyl group,
$R^2$ and $R^3$ independently of one another represent a hydrogen atom, a $C_1$-$C_4$-alkyl group, a $C_2$-$C_4$ hydroxyalkyl group, a $C_1$-$C_4$-alkoxy group, a halogen atom, a sulfonic acid group.

6. The polymer according to claim 1, wherein, as a repeating unit of the formula (II),
   (1) it contains at least one repeating unit of the formula (II-a),

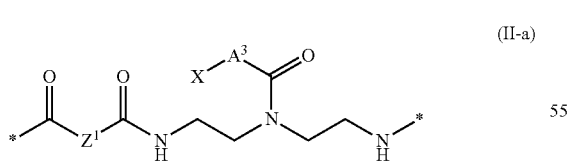

where
$A^3$ represents a $C_1$-$C_6$-alkanediyl group,
$Z^1$ represents a $C_2$-$C_8$-alkanediyl group,
X represents an amino group —N($R^5$)($R^6$) or an ammonio group —N$^+$($R^5$)($R^6$)($R^7$) 1/n An$^{n-}$,
where $R^5$, $R^6$ and $R^7$ each independently represent a hydrogen atom, a $C_1$-$C_4$-alkyl group or a $C_2$-$C_4$ hydroxyalkyl group and 1/n An$^{n-}$ is an equivalent of an n-valent anion; and/or (2) it contains at least one repeating unit of the formula (II-b),

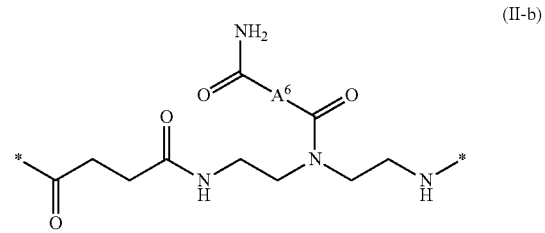

wherein $A^6$ represents a ($C_2$ to $C_6$)-alkanediyl group; and/or (3) it contains at least one repeating unit of the formula (II-c),

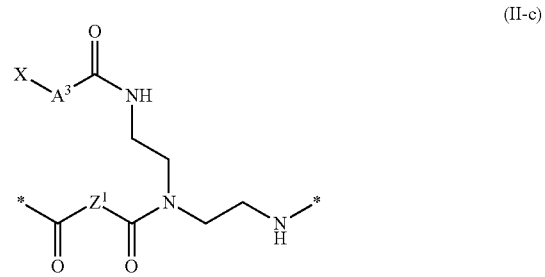

where
$A^3$ represents a $C_1$-$C_6$-alkanediyl group,
$Z^1$ represents a $C_2$-$C_8$-alkanediyl group,
X represents an amino group —N($R^5$)($R^6$) or an ammonio group —N$^+$($R^5$)($R^6$)($R^7$) 1/n An$^{n-}$,
where $R^5$, $R^6$ and $R^7$ each independently represent a hydrogen atom, a $C_1$-$C_4$-alkyl group or a $C_2$-$C_4$ hydroxyalkyl group and 1/n An$^{n-}$ is an equivalent of an n-valent anion; and/or (4) it contains at least one repeating unit of the formula (II-d),

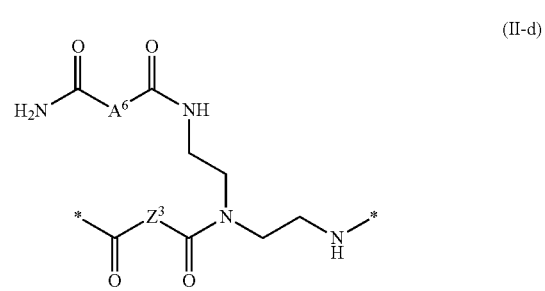

where $A^6$ represents a ($C_2$ to $C_6$)-alkanediyl group,
$Z^3$ represents a $C_2$-$C_8$-alkanediyl group.

7. The polymer according to claim 1, wherein it contains at least one structural unit of the formula (III),

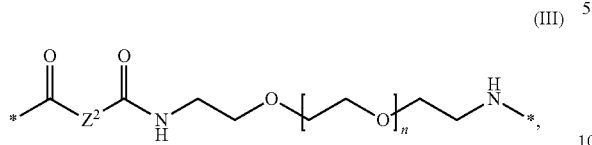
(III)

where n denotes a number from 1 to 10 and $Z^2$ denotes a $C_2$-$C_8$-alkanediyl group.

8. The polymer according to claim 1, wherein it contains at least one repeating unit of the formula (I-c) as the repeating unit of the formula (I),

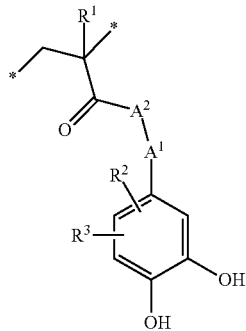
(I-c)

where $R^1$ represents a hydrogen atom or a methyl group, $A^2$ represents an oxygen atom or a group —NH—, $R^2$, $R^3$, and $A^1$ are as defined in formula (I).

9. The polymer according to claim 1, wherein it is used as a repeating unit of the formula (II), (1) it contains at least one repeating unit of the formula (II-e),

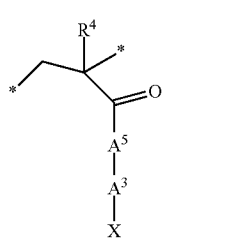
(II-e)

where $R^4$ represents a hydrogen atom or a methyl group, $A^5$ represents an oxygen atom or a group —NH—, $A^3$ represents a $C_2$-$C_6$-alkanediyl group, X represents an amino group —$N(R^5)(R^6)$ or an ammonio group —$N^+(R^5)(R^6)(R^7)$ 1/n $An^{n-}$, where $R^5$, $R^6$ and $R^7$ each independently represent a hydrogen atom, a $C_1$-$C_4$-alkyl group or a $C_2$-$C_4$ hydroxyalkyl group and 1/n $An^{n-}$ is an equivalent of an n-valent anion; and/or (2) it contains at least one repeating unit of the formula (II-g),

(II-g)

where $R^4$ represents a hydrogen atom or a methyl group.

10. The polymer according to claim 1, wherein it contains at least one structural unit of the formula (IV) as the further repeating unit,

(IV)

where $R^8$ represents a hydrogen atom or a methyl group, $A^5$ represents an oxygen atom or a group —NH—, $R^9$ represents a hydroxy-terminated polyalkylene oxide group, a $C_1$-$C_4$-alkyl-terminated polyalkylene oxide group, a $C_2$-$C_6$ hydroxyalkyl group, a $C_3$-$C_6$ polyhydroxyalkyl group, a $C_1$-$C_6$-alkyl group, a $C_1$-$C_4$-alkoxy-$C_2$-$C_4$-alkyl group, a 2-hydroxyethyl group, a 2-hydroxypropyl group, a 2-methyl-1-propanesulfanoic acid group and its sodium salt, an N-[tris(hydroxymethyl)methyl] group, a 2-carboxyethyl group and/or a 3-sulfopropyl group.

11. An agent for the treatment of surfaces wherein it contains at least one polymer according to claim 1 and at least one surfactant.

12. A method for the treatment of substrate surfaces wherein at least polymers according to claim 1 are applied to the surface.

13. The method for the treatment of substrate surfaces wherein at least one agent according to claim 11 is applied to the surface.

* * * * *

UNITED STATES PATENT AND TRADEMARK OFFICE
CERTIFICATE OF CORRECTION

PATENT NO. : 11,873,468 B2
APPLICATION NO. : 16/905523
DATED : January 16, 2024
INVENTOR(S) : Nils Wedler et al.

Page 1 of 1

It is certified that error appears in the above-identified patent and that said Letters Patent is hereby corrected as shown below:

In the Specification

Column 20, Line 60 change " 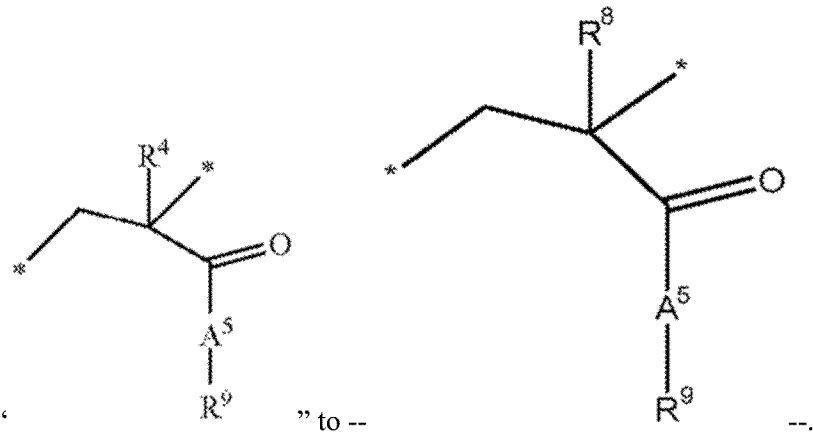 " to -- --.

Column 44, Line 55 change " 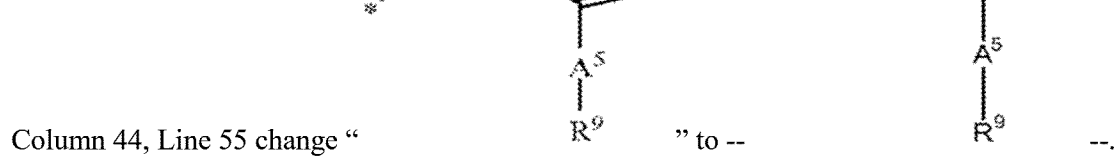 " to -- --.

Signed and Sealed this
Sixth Day of August, 2024

*Katherine Kelly Vidal*

Katherine Kelly Vidal
*Director of the United States Patent and Trademark Office*